United States Patent

Endo et al.

[11] Patent Number: 5,987,227
[45] Date of Patent: Nov. 16, 1999

[54] IMAGE FORMING APPARATUS AND METHOD FOR DETECTING AND ELIMINATING AVOIDABLE IMAGE READING OPERATIONS

[75] Inventors: Tsuyoshi Endo, Kawasaki; Hiroyasu Sumida; Toshiya Tagawa, both of Ichikawa; Kouichi Kanaya, Yokohama; Moriyuki Koike, Funabashi; Hiroshi Mori, Yamato; Hiroomi Motohashi; Norio Michiie, both of Tokyo-to; Tomofumi Harada, Yokohama; Takahiko Uno, Kawasaki; Hisashi Ishiguro, Kawasaki; Yasuhiro Hattori, Kawasaki, all of Japan

[73] Assignee: Ricoh Company, Ltd., Tokyo, Japan

[21] Appl. No.: 08/842,838

[22] Filed: Apr. 17, 1997

[30] Foreign Application Priority Data

Apr. 18, 1996 [JP] Japan ................................. 8-097211
Mar. 17, 1997 [JP] Japan ................................. 9-063255

[51] Int. Cl.⁶ ..................................................... H04N 1/32
[52] U.S. Cl. ............................. 395/112; 395/115; 358/468
[58] Field of Search .................................. 358/404, 444, 358/468; 399/82–85, 367, 403–405, 39; 395/101, 112, 114–117; H04N 1/00, 1/32

[56] References Cited

U.S. PATENT DOCUMENTS 4,963,920  10/1990  Fukushima .
5,241,355   8/1993  Yamashita et al. .
5,550,623   8/1996  Tomita et al. .
5,608,493   3/1997  Tanaka et al. ............................ 399/83
5,809,366   9/1998  Yamakawa et al. ...................... 399/39
5,844,689  12/1998  Kawase ................................... 395/114

FOREIGN PATENT DOCUMENTS 61-269567  11/1986  Japan .
1236169    9/1989  Japan .
1316066   12/1989  Japan .
2-90183    3/1990  Japan .
5107852    4/1993  Japan .
6-95463    4/1994  Japan .

*Primary Examiner*—Kim Yen Vu
*Attorney, Agent, or Firm*—Cooper & Dunham LLP

[57] ABSTRACT

An image forming apparatus for detecting and eliminating avoidable image reading operations includes a scanner for reading an original document, a memory for storing read image data, a printer for forming an image in accordance with the image data read from the memory, a ten-key pad for inputting instructions specifying a total number of sets of copies to be made, various functions to be performed by the apparatus for changing how the copying is performed and a sample set command by which the apparatus enters into a sample set command mode wherein one copy of the original document is output as a sample copy, and a controller for determining whether to use the image previously stored in the memory to output the rest of the total number of sets of copies to be made or performing an operation of reading the original document again depending upon types of functions input via the ten-key pad during the sample set command mode.

24 Claims, 22 Drawing Sheets

Fig. 8

TABLE 1

| 1st Group | 2nd Group |
|---|---|
| Copy Darkness | Staple |
| Copy Size Magnification | Output Page-Number Print |
| N-into-One | All-Page Stamp Print |
| Input Page-Number Print | Specific Page Stamp Print |
| Input Stamp Print | Sort |
| | Double Sided Print |
| | Paper Selection |

IMAGE FORMING APPARATUS AND METHOD FOR DETECTING AND ELIMINATING AVOIDABLE IMAGE READING OPERATIONS

BACKGROUND OF THE INVENTION

1. Field of the Invention

This invention relates to an image forming apparatus having an electric sorting function, and more particularly to an image forming apparatus which has a function of detecting and eliminating avoidable image reading operations after a sample set is output during a time of reproducing multiple print sets.

This invention also relates to a method of performing the above-mentioned function.

2. Discussion of the Background

In recent years, there have been great advances for an image forming apparatus such as a digital copying machine to become a multifunction product aiming to improve ease of use, productivity, and so forth. As an example of this trend, many such image forming apparatuses include a utility apparatus, such as, an automatic document feeding apparatus (hereinafter referred to as an ADF), an automatic sorting apparatus (hereinafter referred to as a sorter), and so forth.

In an ADF-installed image forming apparatus, for example, an improvement has been made in such a way that an original document which includes a number of sheets placed on a document bed of the ADF is automatically transferred to a reading position on a contact glass sheet by sheet. Subsequent operations, such as, a reading operation, an ejection operation in which the read sheet of the original document is ejected to a predetermined eject tray, and so forth, are also executed in a continuously automated manner. Thus, a user is freed from the repetitive actions of placing and removing a sheet of the original document onto the image forming apparatus over and over again.

A sorter is another utility apparatus which provides an image forming apparatus with a feature for reducing an operation time during a multiple copying operation of an original document including multiple sheets. One exemplary use of such a sorter is disclosed in the official gazette of the Japanese Laid Open Patent Application TOKUKAI HEI 1-236169. In this exemplary use of a sorter in combination with a copying machine or the like, any copied sheet corresponding to a sheet after a first sheet of the original document is automatically sorted on the basis of a required number of a multiple copy stored in a memory.

Further, a copying machine disclosed in the official gazette of the Japanese Laid Open Patent Application TOKUKAI HEI 1-316066 teaches an effective way of using a memory for storing images of an original document including multiple sheets so as to be able to electrically sort the images while these images are held in the memory and before starting an image forming operation on a photoconductive drum or the like. As a result, this function for electrically sorting images can eliminate multiple eject trays for selectively receiving multiple copy sheets and consequently the copying machine can be made relatively smaller.

Further, an image forming apparatus which includes a sorter disclosed in the official gazette of the Japanese Laid Open Patent Application TOKUKAI HEI 2-90183 teaches a unique method of using the sorter.

Further, in the official gazettes of the Japanese Laid Open Patent Applications TOKUKAI HEI 5-107852 and TOKUKAI HEI 6-95463, image forming apparatuses are described which are capable of providing a sample set for an operator's visual checking during a time of reproducing multiple copy sets. These inventions enable the operator to change various image forming modes so as to output remaining copy sets in a desired image mode.

However, in the above-mentioned background image forming apparatus having a copy sample serving function, there has been a problem in that, after viewing the sample, the operator is required to place the original document back into a predetermined position in order to proceed with a further operation for outputting the remaining copy sets. For example, in a case when an image forming mode is changed due to a result of the check on the copy sample, the operator is required to place the original document into the predetermined position once again in order to restart a copying operation. In addition, when such an image forming apparatus includes an ADF, the original document must be subjected to an automatic transferring operation once again in which the original document is moved by rubbing friction force by the ADF. Therefore, in this case, the original document may possibly be damaged in a relatively short time.

SUMMARY OF THE INVENTION

Accordingly, an object of the present invention is to provide a novel image forming apparatus which is capable of detecting and eliminating avoidable image reading operations in a sample set command mode during a time of reproducing multiple copy sets.

Another object of the present invention is to provide a novel image forming apparatus which is capable of performing a reproduction of multiple copy sets in a relatively short time.

Another object of the present invention is to provide a novel image forming apparatus which is capable of minimizing a damage to an original document caused by the automatic document feeder.

To achieve the above-mentioned objects, a novel image forming apparatus for detecting and eliminating avoidable image reading operations includes a scanner for reading an original document, a memory for storing read image data, a printer for forming an image in accordance with the image data read from the memory, a ten-key pad for inputting instructions specifying a total number of sets of copies to be made, various functions to be performed by the apparatus for changing how the copying is performed and a sample set command by which the apparatus enters into a sample set command mode wherein one copy of the original document is output as a sample copy, and a controller for determining whether to use the image previously stored in the memory to output the rest of the total number of sets of copies to be made or performing an operation of reading the original document again depending upon types of functions input via the ten-key pad during the sample set command mode.

In the above-mentioned novel image forming apparatus, one of the functions is a staple function, by a change of which in the sample set command mode the image data is read from the memory and used by the printer to form an image.

In the above-mentioned novel image forming apparatus, one of the functions is an output-page-number print function, by a change of which in the sample set command mode the image data is read from the memory and used by the printer to form an image.

In the above-mentioned novel image forming apparatus, one of the functions is an output-stamp-print function, by a change of which in the sample set command mode the image data is read from the memory and used by the printer to form an image.

In the above-mentioned novel image forming apparatus, one of the functions is a sort function, by a change of which in the sample set command mode the image data is read from the memory and used by the printer to form an image.

In the above-mentioned novel image forming apparatus, one of the functions is a double sided print function, by a change of which in the sample set command mode the image data is read from the memory and used by the printer to form an image.

Also, to achieve the above-mentioned objects, a novel image forming apparatus includes steps of reading each sheet of an original document and for generating image data corresponding thereto by a scanner provided at the reading position of the apparatus, and storing image data of each sheet of the original document, read by the scanner, into a memory. The above-mentioned novel image forming apparatus further includes steps of forming an image on an output medium in accordance with the image data, stored in the scanner, by a printer and inputting instructions to the image forming apparatus via a ten-key pad, the instructions including an instruction specifying a total number of sets of copies to be made, instructions specifying various types of functions to be performed by the apparatus and a sample set instruction setting the image forming apparatus into a sample set command mode in which one copy of the original document is output by the printer as a sample copy. The above-mentioned novel image forming apparatus further includes a step of controlling the apparatus, by a controller, depending on the type of functions input by the ten-key pad, wherein in the sample set command mode, after a user views the sample copy the user can input via the ten-key pad, instructions changing one or more of the various types of functions to be performed, the controller controlling the apparatus such that based upon the types of functions changed by the user, the image data is read from the memory and used by the printer to from an image or the scanner rereads each sheet of the original document, the memory stores new image data of each sheet of the original document reread by the scanner and the printer forms and image on the output medium in accordance with the new image data stored in the memory.

In the above-mentioned step of inputting instruction of the image forming apparatus, one of the various types of functions is a staple function, by a change of which in the sample set command mode the image data is read from the memory and used by the printer to form an image.

In the above-mentioned step of inputting instruction of the image forming apparatus is an output-page-number print function, by a change of which in the sample set command mode the image data is read from the memory and used by the printer to form an image.

In the above-mentioned step of inputting instruction of the image forming apparatus is an output-stamp-print function, by a change of which in the sample set command mode the image data is read from the memory and used by the printer to form an image.

In the above-mentioned step of inputting instruction of the image forming apparatus is a sort function, by a change of which in the sample set command mode the image data is read from the memory and used by the printer to form an image.

In the above-mentioned step of inputting instruction of the image forming apparatus is a double sided print function, by a change of which in the sample set command mode the image data is read from the memory and used by the printer to form an image.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8 is a table explaining two groups of image forming related functions;

DESCRIPTION OF THE PREFERRED EMBODIMENTS

Figure 1:
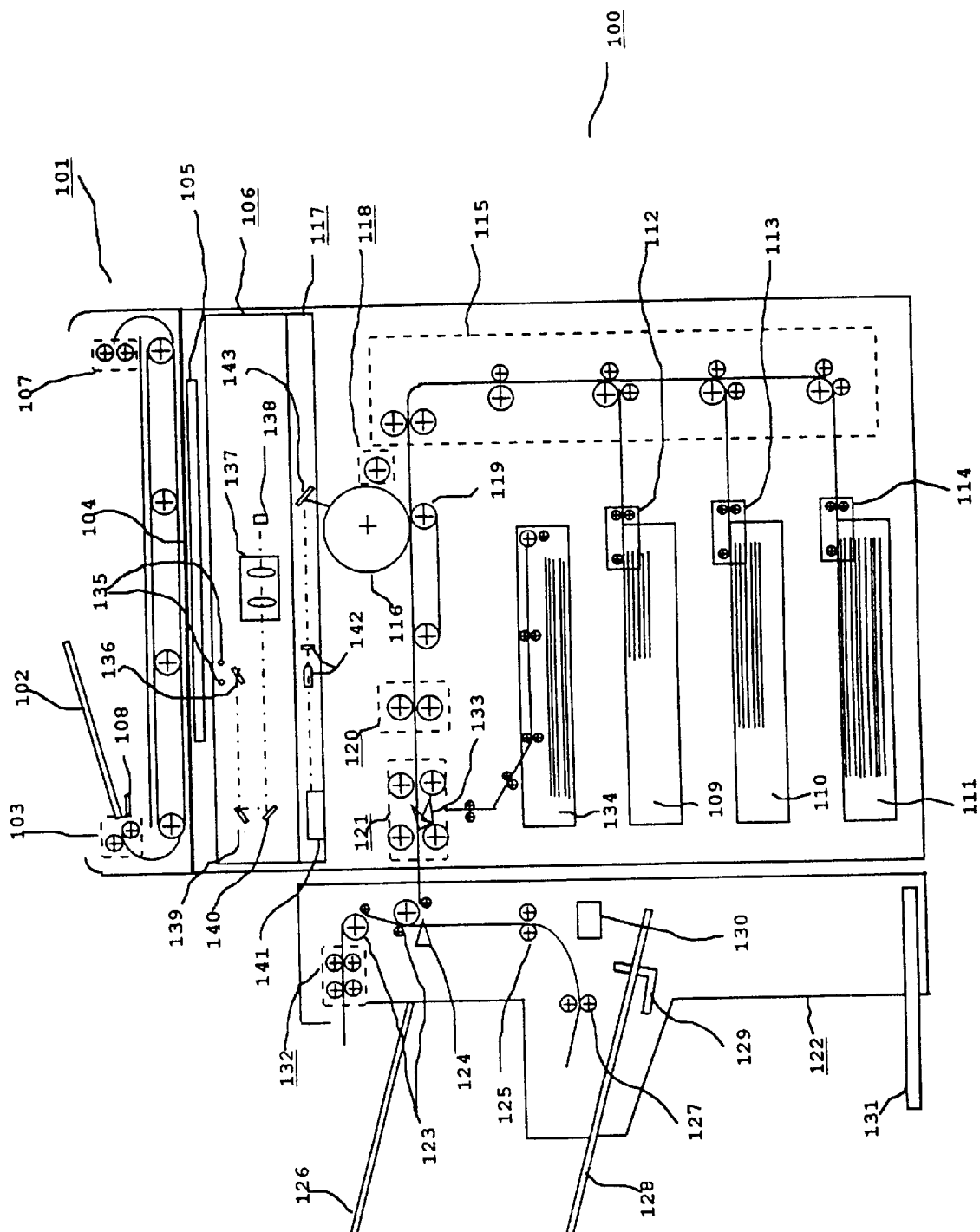
FIG. 1 is an illustration showing an exemplary structure of a novel image forming apparatus as an embodiment according to the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, in which an overall view of a structure of an novel image forming apparatus 100 is shown as an exemplary embodiment of the present invention.

This novel image forming apparatus 100 shown in FIG. 1 includes an automatic document feeder (ADF) 101 having an original document table 102 for holding an original document (not shown) thereon, with an image formed on an upside surface of the original document. When a user presses a print key 202 of an operation panel unit 201 (FIG. 2), which is explained later, a pair of feed rollers 103 of the ADF 101 are activated to rotate a feed belt 104 of the ADF 101 to transfer a bottommost sheet of the above-mentioned original document to a predetermined position on a contact glass 105 of the novel image forming apparatus 100, at which an operation for reading the original document is started.

The sheet of the original document transferred onto the contact glass 105 is then read by a reading unit 106 included in the novel image forming apparatus 100. After a completion of this reading operation, the sheet of the original document is again transferred and ejected out by the feed belt 104 and a pair of eject rollers 107 of the ADF 101.

Subsequently, if an original document detect sensor 108 included in the ADF 101 further detects the original document on the original document table 102, the novel image forming apparatus 100 repeats the above-mentioned sequential actions on the next sheet of the original document.

The above-mentioned pair of feed rollers 103, the feed belt 104, and the pair of the eject rollers 107 are driven by a feed motor 408 (FIG. 4) which is described later.

Further, the novel image forming apparatus 100 includes first, second, and third paper trays 109, 110, and 111 for storing a number of transfer paper sheets to be printed on. These paper trays include the respective paper feed devices 112, 113, and 114, for picking up and feeding out a transfer paper sheet stored therein. The novel image forming apparatus 100 further includes a vertical transfer unit 115 for transferring the transfer paper sheet upwards to a position where contact with a photoconductor 116 is made.

Onto a surface of this photoconductor 116, an image of the sheet of the original document read by the aforementioned reading unit 106 is written as image data with a laser beam (not shown) generated from a writing unit 117. Then, such an image written on the surface of the photoconductor 116 is formed into a visible toner image by a function of a development unit 118.

Then, the transfer paper sheet is further moved by a transfer belt 119 at a speed equal to a rotation speed of the photoconductor 116, and receives the toner image formed on the surface of the photoconductor 116. After completely receiving the toner image from the photoconductor 116, the transfer paper sheet is further transferred to a fixing unit 120 which fixes toner of the toner image onto the transfer paper sheet. Subsequently, the transfer paper sheet having the fixed toner image thereon is forwarded to a finisher 122 by an eject unit 121.

Finisher 122 further transfers the transfer paper sheet, having the thus fixed toner image, towards an eject tray 126 or a staple processing unit. The staple processing unit is shown in a bottom half portion of the finisher 122 in FIG. 1. Whether to transfer the transfer paper sheet to the eject tray 126 or the staple processing unit is selected using a switch plate 124. More specifically, one position of the switch plate 124 is used in a usual operation in which the transfer paper sheet can be directed to the eject tray 126, passing through a pair of eject rollers 123 and a transferring roller unit 132, when the switch plate 124 is switched to an upper direction. The other position of the switch plate 124 directs the transfer paper sheet to a stapling table 128, passing through pairs of transfer rollers 125 and 127, when the switch plate 124 is switched to a lower direction.

The transfer paper sheet, which is thus placed on the stapling table 128, is jogged by a jogger 129 each time a transfer paper sheet is added to create a stack. Then, when the stapling table 128 receives a number of transfer paper sheets regarded as one complete copy set from the original document, a stapler 130 staples this copy set. The stapled copy set then falls onto a stapled copy eject tray 131 by its own weight.

The eject tray 126 is movable in a perpendicular direction relative to the surface of FIG. 1 so as to be capable of sorting the ejected transfer paper sheets. This function of the eject tray 126 can sort the transfer paper sheets in various sorting modes. For example, the sheets can be sorted as single pages of the original document or as complete copy sets of the original document. In the single page sorting mode, the eject tray 126, at its one position, receives successively ejected transfer paper sheets which include a same toner image from a same page of the original document. Then, the eject tray 126 moves to another position when the next page of the original document is copied. Alternatively, in the complete copy set copy mode, the eject tray 126, at one position, receives successively ejected transfer paper sheets which include a complete set of pages of the original document, and then moves to another position to receive another complete set of pages of the original document. In such a case, the images of the original document are sorted using an image memory 501 (FIG. 5) which is described later.

When images from the original document are transferred to both surfaces of a transfer paper sheet, which operation is generally called a double sided copy or a duplex copy, a transfer paper sheet from either the first, second, or third paper tray 109, 110, or 111 is transferred to a duplex paper station unit 134, after having passed through the regions of the device for performing the image transfer from the photoconductor 116, the image fixing, and so forth. In this case, a switch pawl 133 is in its upper position and directs the transfer paper sheet to the duplex paper station unit 134. The switch pawl 134 is used to direct the transfer paper sheet either to the finisher 122 or the duplex paper station unit 134.

Subsequently, the transfer paper sheet held in the duplex paper station unit 134 is again picked up and fed out towards the photoconductor 116 to receive an image on the other surface. After this second image transfer operation, the transfer paper sheet is transferred and ejected into the eject tray 126 by setting the switch pawl 133 at its lower position.

The above-mentioned photoconductor 116, the transfer belt 119, the fixing unit 120, the eject unit 121, and the development unit 118 are driven by a main motor 403 (FIG. 4) described later. The first, second, and third paper feed devices 112, 113, and 114 are also driven by the main motor 403 using the respective first, second, and third feed clutches 404, 405, and 406 (FIG. 4), which are also described later. The vertical transfer unit 115 is also driven by the main motor 403 using an intermediate clutch 407 (FIG. 4), which is also described later.

Next, an operation of how an image is read from an original document and a duplicate image is then formed as an electrical latent image on a photoconductive material is described with reference to FIG. 1. More specifically, how the reading unit 106 reads an image of an original document and also how the writing unit 117 writes data of the read image are explained hereinafter. A latent image represents an electrical distribution on the whole surface of a photoconductor. Such an electrical distribution results from writing operation, in which the whole surface of the photoconductor is exposed to a light beam so that image data, converted from an electrical form to an optical form, is written on the surface of the photoconductor.

The reading unit 106 includes the contact glass 105 for flatly supporting a sheet of an original document and an optical scanning system. The optical scanning system includes an exposure lamp 135 as a light source, a first mirror 136, a lens 137, a CCD (charged couple device) image sensor 138, a second mirror 139, a third mirror 140, and so forth. The exposure lamp 135 and the first mirror 136 are secured on a first carriage (not shown). The second and third mirrors 139 and 140 are secured on a second carriage (not shown). When the reading unit 106 reads an image of an original document, the first and second carriages move at relative speeds of 2 to 1 so as to maintain a path length of the light constant. This optical system is driven by a scanner drive motor which is not shown.

An image of the original document is read by the CCD image sensor 138 and then converted into an electrical signal to be electrically processed. A size magnification of the read image is performed by shifting positions of the lens 137 and the CCD image sensor 138 in the left or right direction in FIG. 1. More specifically, positions of the lens 137 and the CCD image sensor 138 are determined in accordance with a designated scale of the image magnification.

The writing unit 117 includes a laser generating unit 141, a focus lens 142, and a mirror 143. The laser generating unit 141 internally includes a laser diode (not shown) for serving as a laser beam source, a polygon motor (not shown), and a rotary polygonal mirror (not shown) which is rotated at a relatively high speed by the polygon motor.

A laser beam generated from the laser generating unit 141 is deflected by the polygon mirror rotating at a constant speed and becomes a scanning laser beam. Then, the scanning laser beam passes through the focus lens 142 and is reflected by the mirror 143 to the direction of the photoconductor 116. Subsequently, the scanning laser beam impinges on the surface of the photoconductor 116 on which an image is focused.

The scanning laser beam falling on the photoconductor 116 starts a scanning motion in the transverse direction to the rotation of the photoconductor 116. This scanning motion may be referred to as a main scanning motion. In a similar way, a rotational motion of the photoconductor 116 may be referred to as a sub-scanning motion. During an optical writing operation in the main scanning direction, an image signal on the laser beam is accordingly transferred onto the surface of the photoconductor 116 and serial data of one main scanning line length is consequently recorded on the surface of the photoconductor 116. This image signal is generated by and sent from an image processing unit 402 which is explained later. The writing unit 117 repeats the main scanning motion, over and over again, in a predetermined cycle in accordance with a rotation speed of the photoconductor 116 and a recording density of the writing operation by the laser beam. In this way, an electrostatic latent image is formed on the surface of the photoconductor 116.

A beam sensor (not shown) is provided near a side end of the surface of the photoconductor 116. This beam sensor generates a main scanning synchronizing signal when detecting a laser beam. This main scanning synchronizing signal is utilized to control timing of signals during an image writing operation, and to generate a control signal for controlling image signal input and output, which is explained later.

Next, an exemplary configuration of the operation panel unit of the novel image forming apparatus 100, which provides information through a display to a user and serves as an entry device for the user to input instructions, is explained with reference to FIGS. 2 and 3.

Figure 2:
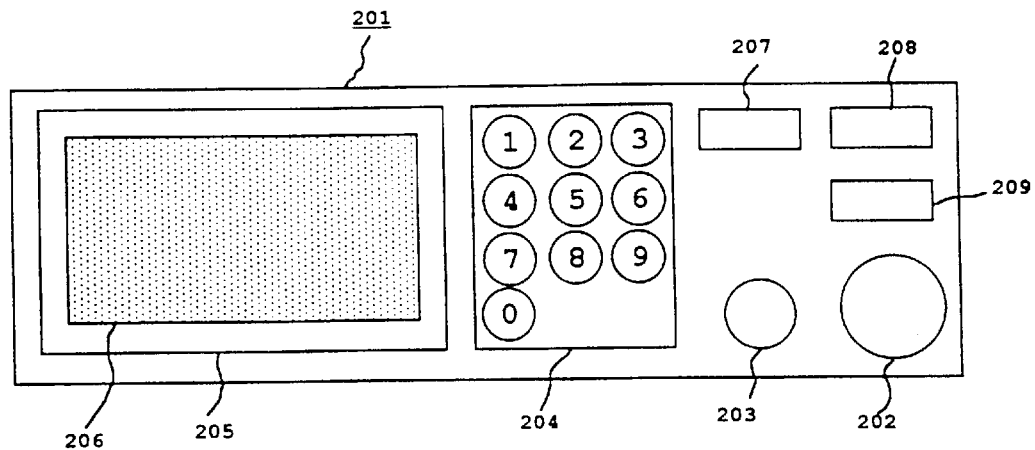
FIG. 2 is an illustration showing an exemplary configuration of an operation panel installed on the novel image forming apparatus shown in FIG. 1.

As shown in FIG. 2, the operation panel unit 201 includes a start key 202 for starting a copying operation or an image forming operation, a clear and stop key 203, a ten-key pad 204, an LCD (liquid crystal display) 205, a default set key 207, a mode clear key 208, and a sample set command key 209. The LCD 205 displays various messages indicative of status information of a number of copy sets, machine conditions, and so forth. Also, the LCD 205 is provided with a touch-sensing-panel 206 securely adhered thereon to form various messages and keys, so that a user can input an appropriate instruction by using these keys in accordance with messages displayed.

Figure 3:
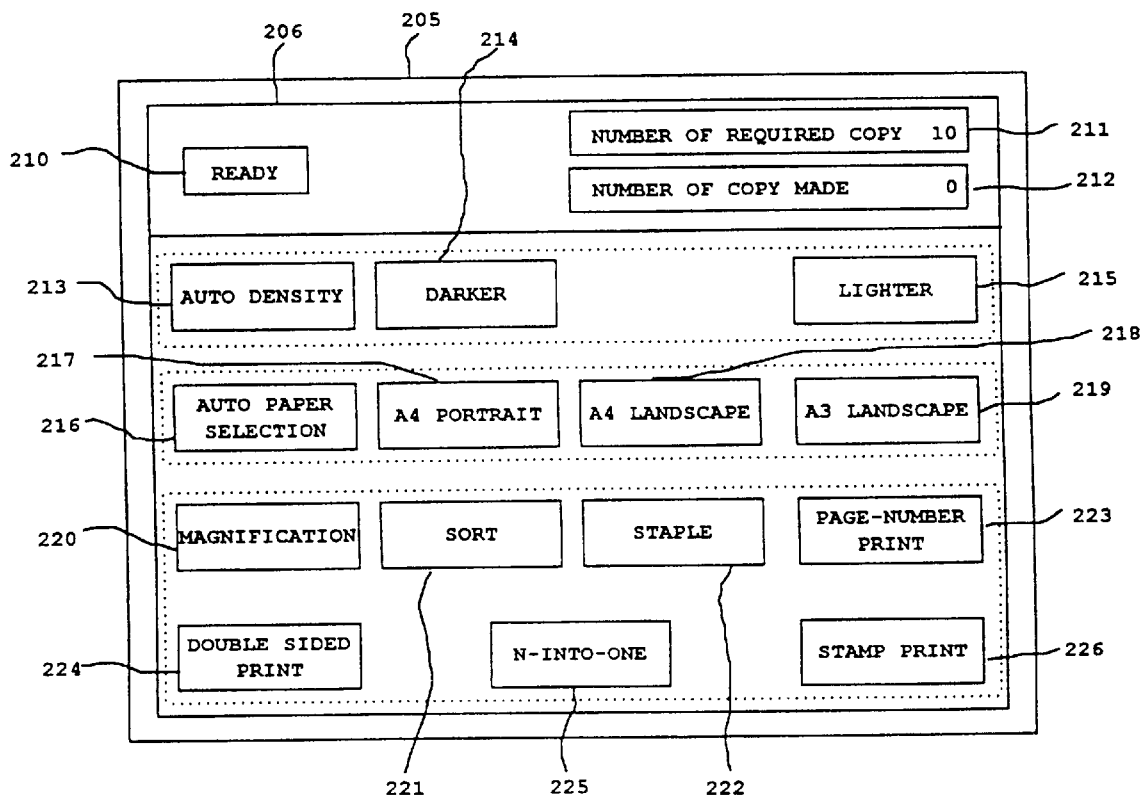
FIG. 3 is an illustration showing an exemplary display format of a liquid crystal display (LCD) installed on the novel image forming apparatus shown in FIG. 1.

In FIG. 3, an example of a display on the LCD 205 of the operation panel unit 201 is illustrated. The LCD 205 displays various messages and keys. For example, messages, such as, "ready" 210, "number of required copies" 211, and "number of copies made" 212 are displayed as status information during a copying operation on the novel image forming apparatus 100. Further, for example, "auto density" 213, "darker" 214, and "lighter" 215 are displayed as selective instruction keys for selecting density. Further, for example, "auto paper selection" 216, "A4 portrait" 217, "A4 landscape" 218, and "A3 landscape" 219 are displayed as selective instruction keys for selecting the size paper to be printed on. Further, for example, "magnification" 220, "sort" 221, "staple" 222, "page-number print" 223, "double sided print" 224, "N-into-one" 225, and "stamp print" 226 are displayed as selective instruction keys for performing versatile functions.

Among these various messages/keys displayed on the LCD 205, a user may select a key by pressing the corresponding region of the touch-sensing-panel 206. Then, the novel image forming apparatus 100 executes a function of the selected key. The selected key is displayed in a highlight color to indicate that the key is selected and the function is to be executed.

When an operator presses the "magnification" key 220 for performing a copy size magnification function, for example, among the various selective keys representing various functions, the LCD 205 displays a message asking the operator to input a magnification ratio, for example.

A liquid crystal display (LCD) capable of displaying graphical information by using a fine dot matrix is utilized as the above-mentioned display unit in the embodiment of the present invention, so that a message may preferably be displayed in a clear manner and in a graphic form on an as needed basis. However, it is not limited to the LCD and other display devices such as a plasma display, and so forth may be applied.

Next, a detailed operation of a control system of the novel image forming apparatus 100 is explained with reference to FIG. 4. As is shown in FIG. 4, a main controller 401 which controls an entire operation of the novel image forming apparatus 100 is connected with various satellite units, which are decentralized control units, such as an IPU (image processing unit) 402, the ADF 101, and the operation panel unit 201.

The IPU 402 controls various operations performed by the apparatus including a reading operation performed by the reading unit 106 and its associated portions, an operation of writing an image of an original document into an image memory 501 which is described later, an operation of forming an image from the image data stored in the image memory 501, and so forth. The ADF 101 includes the original document detect sensor 108 as mentioned earlier and also the feed motor 408.

In addition, the main controller 401 communicates with the above-mentioned decentralized control units by exchanging job status, instructions, and so forth on a demand basis.

Figure 4:
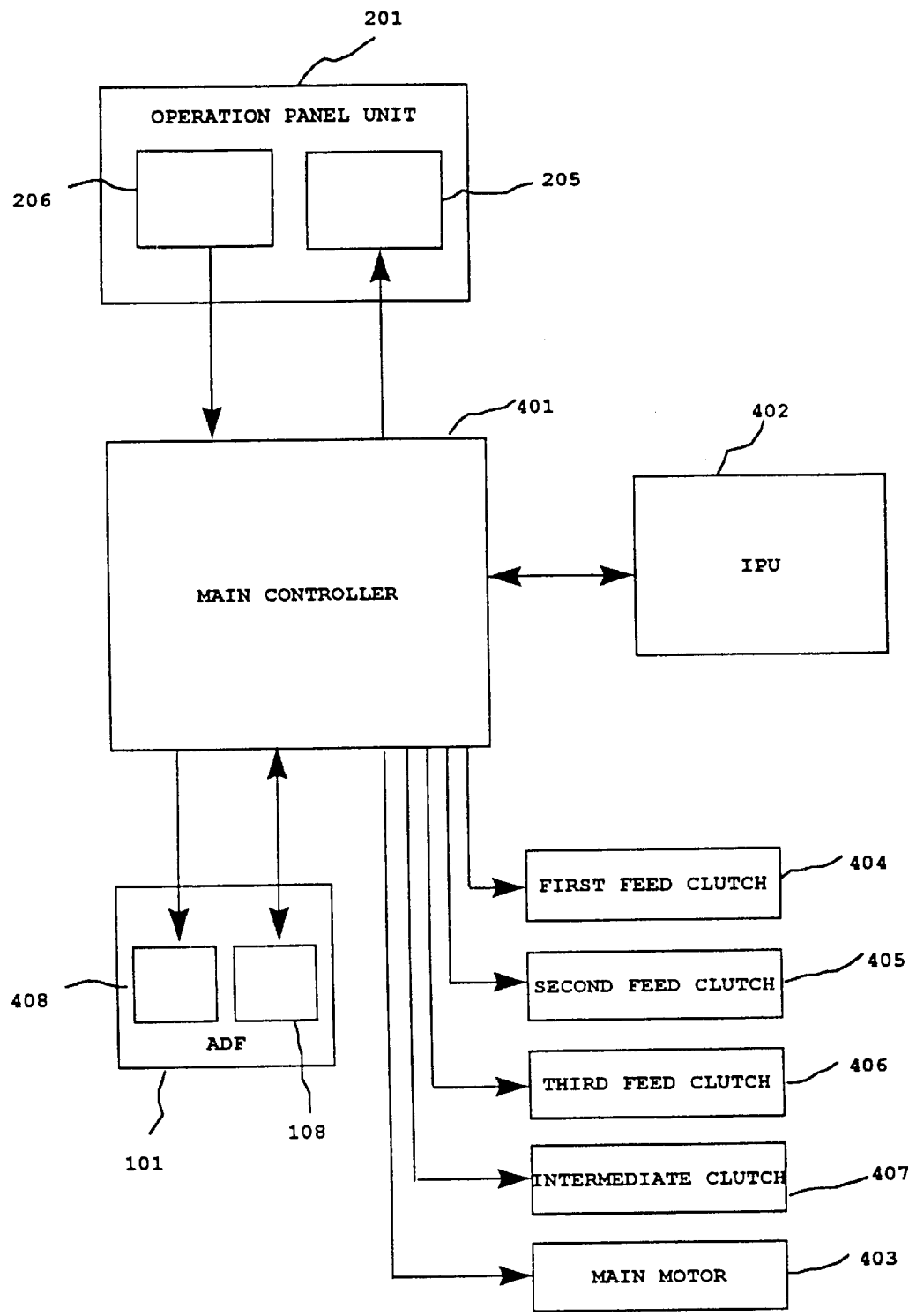
FIG. 4 a block diagram explaining a control system of the novel image forming apparatus shown in FIG. 1.

As shown in FIG. 4, the main controller 401 is also connected with the main motor 403 for driving various rotary elements such as the photoconductor 116, and so forth, as mentioned earlier. Further, the main controller 401 is connected with first, second, and third feed clutches 404, 405, and 406, and also an intermediate clutch 407, so as to control each of these clutches.

Next, a configuration of the IPU 402 is explained in detail by reference to FIG. 5. The CCD image sensor 138 converts image information in an optical form into an image signal in an analog electrical form. The image signal is then converted into a digital signal by an A/D (analog to digital) converter 503. Subsequently, the digital signal is subjected to shading correction by a shading correction circuit 504 and, then, to MTF (modulation transfer function) and gamma corrections by MTF and gamma correction circuits 504.

An overlay print image generator 509 generates a print image in accordance with an instruction provided by the operator through the operation panel unit 201. The overlay print image generator 509 then sends print image data to either a first overlay print circuit 506 or a second overlay print circuit 507 depending upon a type of overlay print function. The types of overlay print functions are explained later.

A selector 502 receives image data from the MTF and gamma correction circuits 505 through the first overlay print circuit 506 and stores the image data therein. Then, the selector 502 sends the image data either towards a size magnification circuit 508 through the second overlay print circuit 507 or towards an image memory controller 510. The image data is converted by the size magnification circuit 508 so that a size of the image represented by the image data is reduced or magnified in accordance with a selected magnification ratio. Then, the image data is sent to the writing unit 117.

The IPU 402 includes a sample set command circuit 515 for executing a sample set command during a time of reproducing multiple copy sets in a sorting mode. Further details of this sample set command circuit 515 are described later.

The image memory controller 510 is connected with the selector 502, via a bi-directional data and address buses for image data.

Figure 5:
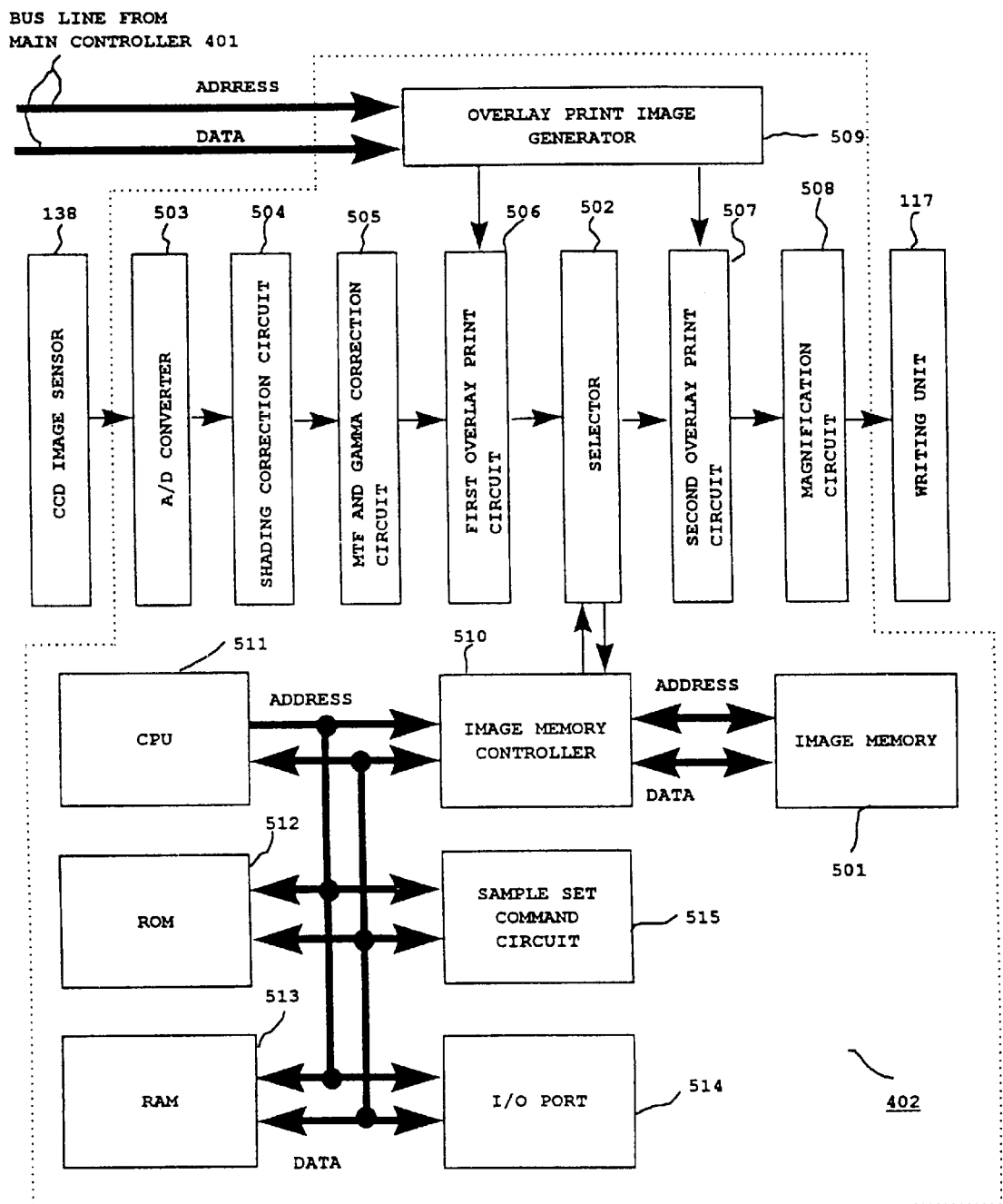
FIG. 5 is a block diagram explaining an image processing unit (IPU) included in the control system shown in FIG. 4.

The IPU 402 also includes a circuit, which is not shown in FIG. 5, for selecting from among a number of data inputs or data outputs. This is because the IPU 402 is capable of receiving external image data in addition to the image data input through the reading unit 106. Such external image data may be entered from an external data processing machine such as a personal computer or the like, through an I/O (input and output) port 514.

Further, the IPU 402 includes a CPU 511 for providing various instructive information to the image memory controller 510 and so on, and for controlling the reading unit 106 and the writing unit 117. The IPU 402 further includes a ROM (read only memory) 512 for storing a program for the CPU 511 and a RAM (random access memory) 513 for storing various data. The CPU 511 has a configuration so as to write data to and read data from the image memory 501 through the image memory controller 510.

Figure 6:
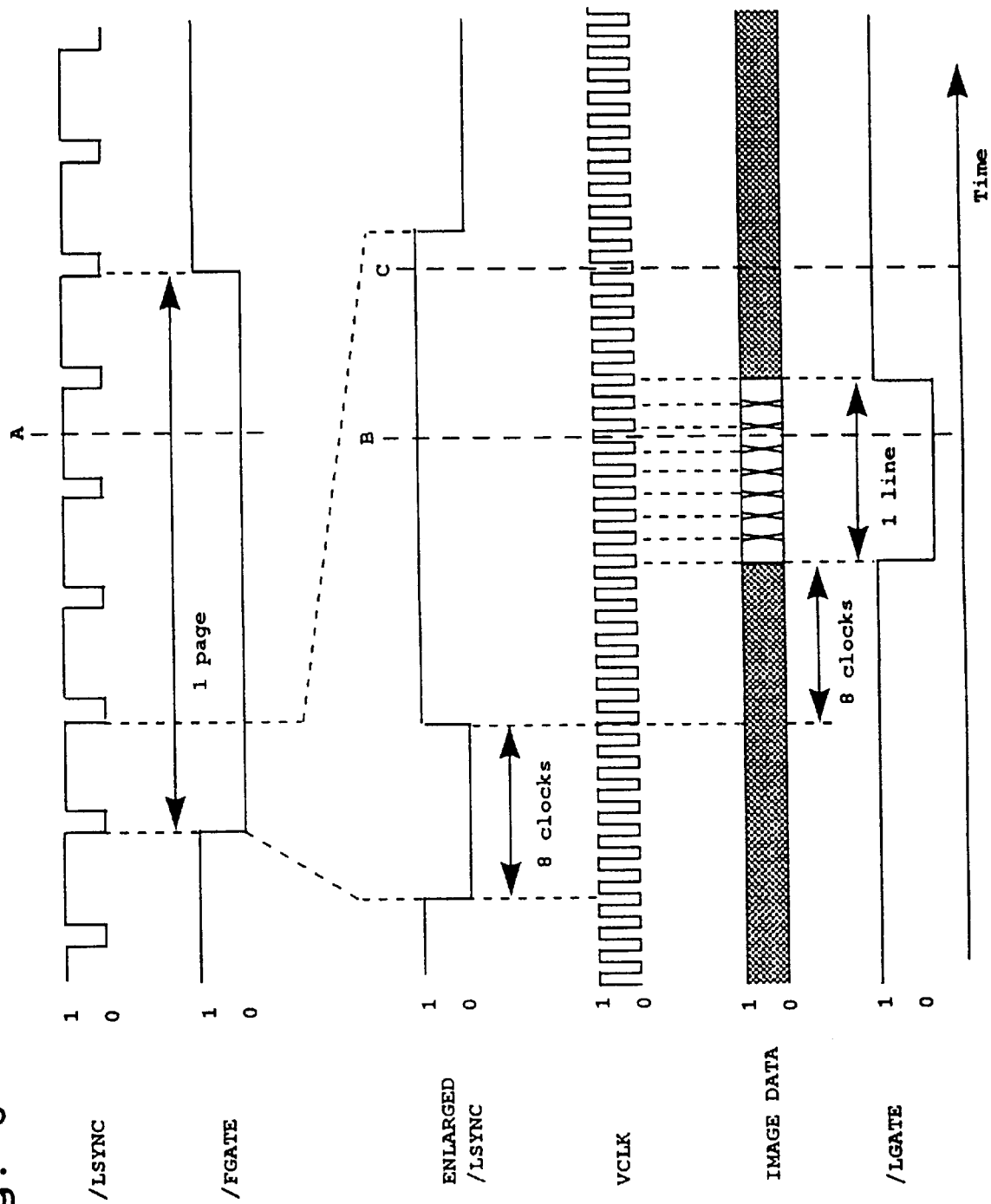
FIG. 6 is a timing chart showing a relationship between an image signal for one page and a clock.

Next, an operation how image data is handled by the selector 502 is explained in detail with reference to FIG. 6. FIG. 6 is an exemplary timing chart for explaining relationships of time between a series of image data and various signals. In this embodiment, the IPU 402 generates a video clock signal (hereinafter called VCLK) and makes every picture element of image data in synchronism with one cycle of VCLK.

A frame gate signal (hereinafter called /FGATE), which is in synchronism with VCLK, provides a time frame in which image data in a period of a sub-scanning operation is made valid. More specifically, a page block of image data is made valid during a time when the /FGATE is held at a low level, while no image data is made valid during a time when /FGATE is held at a high level.

A main scanning synchronizing signal (hereinafter called /LSYNC), which also runs in synchronism with the VCLK, provides a time frame in which image data in a period of a main scanning operation is made valid. The image data thus made valid by the /LSYNC is referred to as a line block of image data. More specifically, this time frame provided by the /LSYNC has; a time width of a predetermined number of the VCLK for a pulse width of the /LSYNC during a time when the /LSYNC is held at a low level, a predetermined number of the VCLK before a line block of image data, the line block of image data, and a predetermined number of the VCLK after the line block of image data. Thus, the /LSYNC provides a time window for the line block of image data, which constitutes a page block of image data. In the IPU 402 of this embodiment, a pulse width of the /LSYNC is made of eight clocks of the VCLK, as an example.

A line gate signal (hereinafter called /LGATE), which is also generated in synchronism with the VCLK, provides a time window in which a line block of image data is actually made valid. More specifically, the /LGATE falls to a low level in eight clocks of the VCLK, for example, upon a time when the /LSYNC rises to a high level. Then, the /LGATE is held at the low level for a predetermined time of a number of the VCLK. During the time period when the /LSYNC is held at the low level, a line block of image data is made valid.

The IPU 402 includes separate circuits for generating signals of the /FGATE, the /LSYNC, the /LGATE, and the VCLK for each of an image input and an image output. Any further detail of these circuits is not herein disclosed since each of these circuits individually are well known in the art. However, it should be pointed out that unlike in the prior art, the present invention includes two separate circuits for generating these signals. The reason is for this that the IPU 402 according to the present invention is capable of separately adjusting phases of input and output image signals by having these two sets of separate circuits and can accordingly form an image in a preferred and superior quality.

Figure 7:
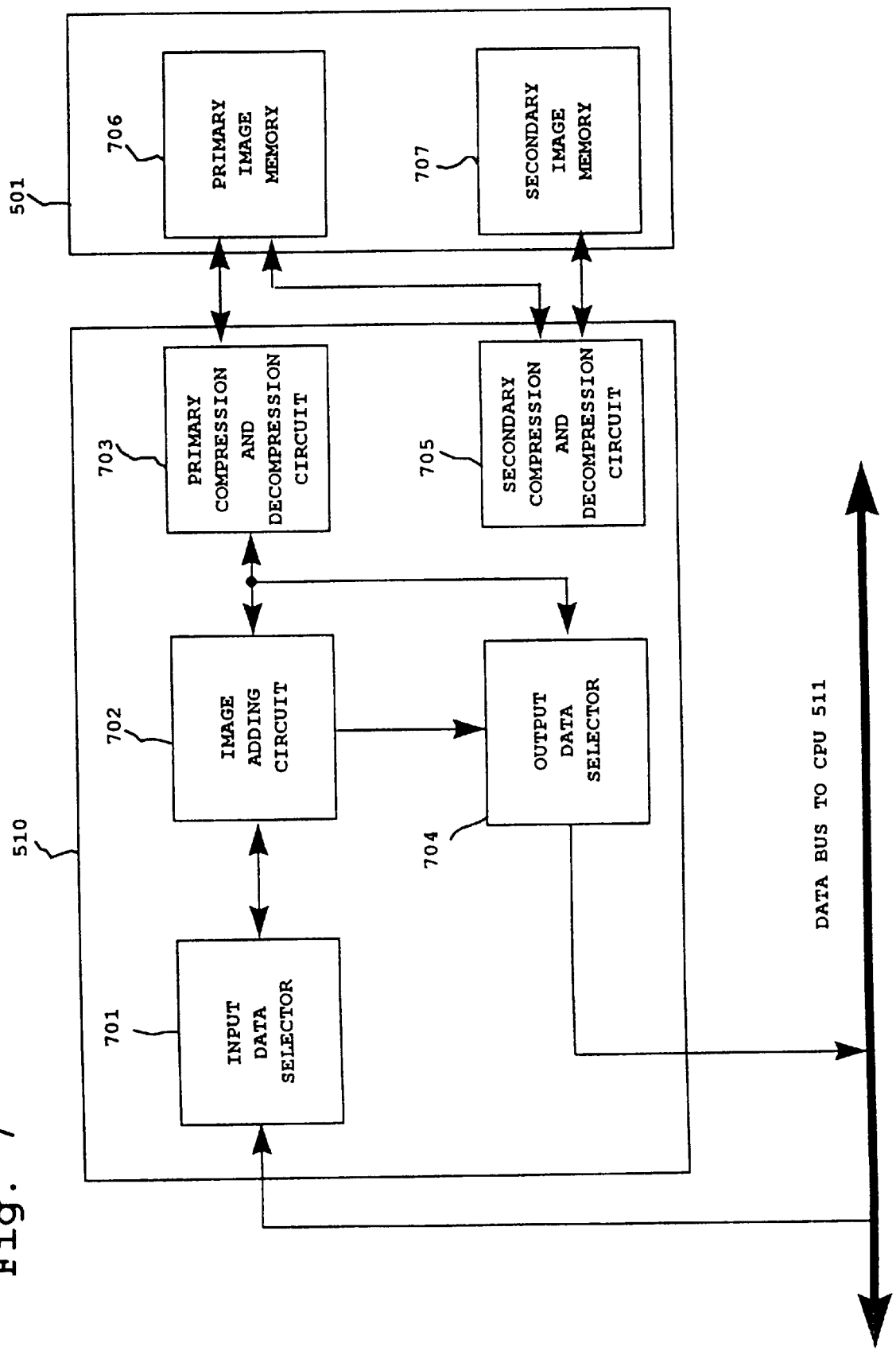
FIG. 7 is a block diagram explaining detailed configurations of an image memory controller and an image memory included in the image processing unit shown in FIG. 5.

Next, an operation of storing read image data of a page into the image memory 501 where image data of previous pages is previously stored is explained with reference to FIG. 7. FIG. 7 is a block diagram of circuits including the image memory controller 510 and the image memory 501.

The image memory controller 510 includes an input data selector 701, an image adding circuit 702, primary compression and decompression circuits 703, an output data selector 704, and secondary compression and decompression circuits 705. These circuits are provided with two bus line systems, a data bus line system including data and address buses and a control data bus line system including data and address buses. The CPU 511 provides the various control data to these circuits. Bus lines illustrated in both FIGS. 5 and 7 are all of the data bus line system, and the control data bus line is not illustrated.

When the image memory controller 510 executes an operation of storing read image data of a page into the image memory 501 where image data of previous pages is previously stored, the input data selector 701 of the image memory controller 510 first selects image data of a page, sent from the reading unit 106, to be written into the primary memory 706 of the image memory 501 from among a plurality of data sources. The read image data of a page selected by the input data selector 701 is subsequently sent to the image adding circuit 702, into which image data of previous pages previously stored in the image memory 501 is also read. Then, the read image data of a page is added to image data of previous pages by the image adding circuit 702. After this adding operation by the image adding circuit 702, the image data is compressed by the primary compression and decompression circuits 703 and then written into the primary memory 706 of the image memory 501. At this time, when the image data is in a complex data handling mode such as a sort mode or the like, the image data is needed to be further shrunk and to be then stored at a memory area other than the primary memory 706. Specifically, in such a case, the image data once compressed and stored into the primary memory 706 may further be compressed by the secondary compression and decompression circuits 705 on an as needed basis, and then stored into the secondary memory 707 of the image memory 501. In this way, the image memory controller 510 executes the operation of storing the image data of a page into the image memory 501 where image data of previous pages is previously stored.

When the image memory controller 510 executes an operation of reading image data from the image memory 501, the image memory controller 510 first reads image data stored in the primary memory 706. The image data read from the primary memory 706 is sent to the primary compression and decompression circuits 703 and decompressed. Then, one of the decompressed image data and the decompressed image data added to the input data is selected by the output data selector 704, and consequently output from the image memory controller 510.

In this case, an operation of adding the input data to image data from the primary memory 706 is executed by the image adding circuit 702 since the image adding circuit 702 is capable of adjusting a phase of image data. In addition, the image adding circuit 702 selects a circuit to which image data is output. The circuit to be selected is the output data selector 704 in a case of outputting image data, and the primary memory 706 in a case of rewriting image data. On an as needed basis, the image adding circuit 702 is capable of outputting image data to both the output data selector 704 and the primary memory 706 at the same time.

Further, when image data under retrieval is not found in the primary memory 706, the image memory controller 510 reads image data stored in the secondary memory 707 in which twice decompressed image data is stored. In this case, the read data from the secondary memory 707 is sent to the secondary compression and decompression circuits 705 and decompressed. Then, the decompressed image data is sent to the primary memory 706 in which image data with once time decompression is stored. Subsequently, the image memory controller 510 executes an outputting operation from the primary image memory 706 as described above.

In such a way as mentioned above, the image memory controller 510 executes the operation of reading image data from the image memory 501.

As described above, the image memory 501 includes a primary memory 706 and a secondary memory 707. A preferable memory for the primary memory 706 may be a fast access time memory such as a DRAM (dynamic random access memory), or the like, so that a read and write operation with respect to the image memory 501 can be achieved in a relatively fast manner. Also, the primary memory 706 has a configuration for executing a fast read and writing operation regardless of a size of data to be handled. Although not shown in the drawings, this configuration is implemented at an interface part of the image memory 501 connected to the image memory controller 510, in the embodiment of the present invention. In this configuration of the primary memory 706, data is automatically divided into a number of smaller data blocks when a size of data exceeds a limit for data handling of a read and write operation in one time.

The secondary memory 707 of the image memory 501 is a memory of large capacity for storing plural blocks of data to be combined or sorted. This secondary memory 707 may also be ideally configured by a number of DRAMs, so that the primary memory 706 and the secondary memory 707 can be configured as one memory and a controlling operation of the image memory 501 by the image memory controller 510 may become relatively simpler. However, this configuration extremely increases the memory cost due to a high cost of the DRAM and, therefore, the DRAM is used in a memory area required for a read and write operation in this embodiment of the present invention which can assure a relatively high speed operation in a relatively low cost.

By the thus arranged image memory 501 having the primary memory 706 and the secondary memory 707, the novel image forming apparatus 100, which is capable of processing operations, such as, inputting and outputting, storing, manipulating, and so forth, on a large amount of image data, can be made relatively inexpensive and in a relatively simple structure. An N-into-one function is an example of one of the above-mentioned large memory eating operations, in which a number of images read from the same number of pages of an original document are combined into one image so as to be printed on a single sheet of paper, for example. In this case, when a number of the read images from the same number of pages of an original document are stored into the primary memory 706, the image data for the number of the read images is stored in order in the same format as when these images are printed in one image on a sheet of paper.

Next, an operation of detecting and eliminating avoidable reading operations by the thus configured novel image forming apparatus 100 is explained. This novel image forming apparatus 100 has a so-called sample set command mode for providing an operator with a sample set from an original document, after which the apparatus enters a waiting mode waiting for an operator's further instruction. At this time, an operator can check whether or not the output sample set is made in a way as desired. In a case that the sample set is not made in a preferred manner, the operator can instruct the novel image forming apparatus 100 to change how the copying is performed. Of course, the operator may instruct the novel image forming apparatus 100 to continue the copying operation without changing how the copying is performed, in a case when the sample set is made in a preferred manner.

During such a time when the novel image forming apparatus 100 is in a waiting mode, the operator is conveniently allowed to change conditions of various copy modes, such as, darkness of an image, copy size magnification, stapling, page-number print, stamp print, page sorting, single sided copy or double sided copy, and so forth.

According to the present invention, it is only necessary that the operation of reading the original document be performed again when certain functions are changed by the operator during the waiting mode. That is, the image forming apparatus is so arranged to execute an operation of reading the original document once again when the operator changes conditions of a copy mode requiring new read data of an image and to skip an operation of reading the original document when the operator changes conditions of a copy mode that do not require no new read data of an image and wen allow the use of the image data previously stored in memory.

One copy mode group which requires new read data of an image, as mentioned above, includes copy darkness and copy size magnification, as examples. It is known that a change of darkness of an image requires a great deal of time to calculate image data in a whole area of the page and is normally performed by an execution of a reading operation rather than a calculation. More specifically, in the case of a reading operation, an original document is needed to be read with a changed exposure light amount in accordance with a changed amount of darkness of an image. Thus, new read data of an image having a changed darkness is obtained and newly stored into the image memory 501. This is faster than modifying the data already stored in memory to change the copy darkness.

Also, it is known that a change of copy magnification requires a great deal of time to calculate image data in a whole area of the page and is normally performed by an execution of a reading operation rather than a calculation. More specifically, in the case of a reading operation, an original document is needed to be read at a changed reading speed in the sub-scanning direction in accordance with a changed amount of the magnification ratio. Thus, new read data of an image having a changed copy magnification ratio is obtained and newly stored into the image memory 501. This is also faster than modifying the data already stored in memory to change the magnification.

Table 1 shown in FIG. 8 explains two groups of copy modes; requiring a reading operation, and requiring no reading operation, as described above. The first group includes a copy darkness mode, a copy size magnification mode, an N-into-one mode, an input side page-number print mode, and an input side stamp print mode. The second group includes a staple mode, an output page-number print mode, an all page stamp print mode, a specific page stamp print mode, a double sided print mode, and a sort mode. Each of these groups may include further copy modes, such as a paper tray selection, as an example. After a check of a sample set, an operator may need to change a paper size or a paper format, for example.

A staple function is performed by the stapler 130 located after the reading unit 117 and at an end part of the paper flow along the paper path. Accordingly, the staple mode can be changed using an image previously stored in the image memory 501. The staple mode is consequently grouped in the second group in Table 1 shown in FIG. 8.

A page-number print function includes two modes. One page-number print mode is performed on image data by the first overlay print circuit 506 which is located before the image memory 501. Accordingly, this page-number print mode can only be changed using new read data of an image and can not be changed using an image previously stored in the image memory 501 where the image is already edited by a sort function, for example. This type of a page-number print mode may be referred to as an input side page-number print mode (i.e., input page-number print.) The input side page-number print mode is consequently grouped in the first group in Table 1 shown in FIG. 8. The other page-number print mode is performed on image data by the second overlay print circuit 507 which is located after the image memory 501. Accordingly, this page-number print mode can be changed using an image previously stored in the image memory 501. This type of a page-number print mode may be referred to as an output side page-number print mode (i.e., output page-number print.) The output side page-number print mode is consequently grouped in the second group in Table 1 shown in FIG. 8.

Figure 9:
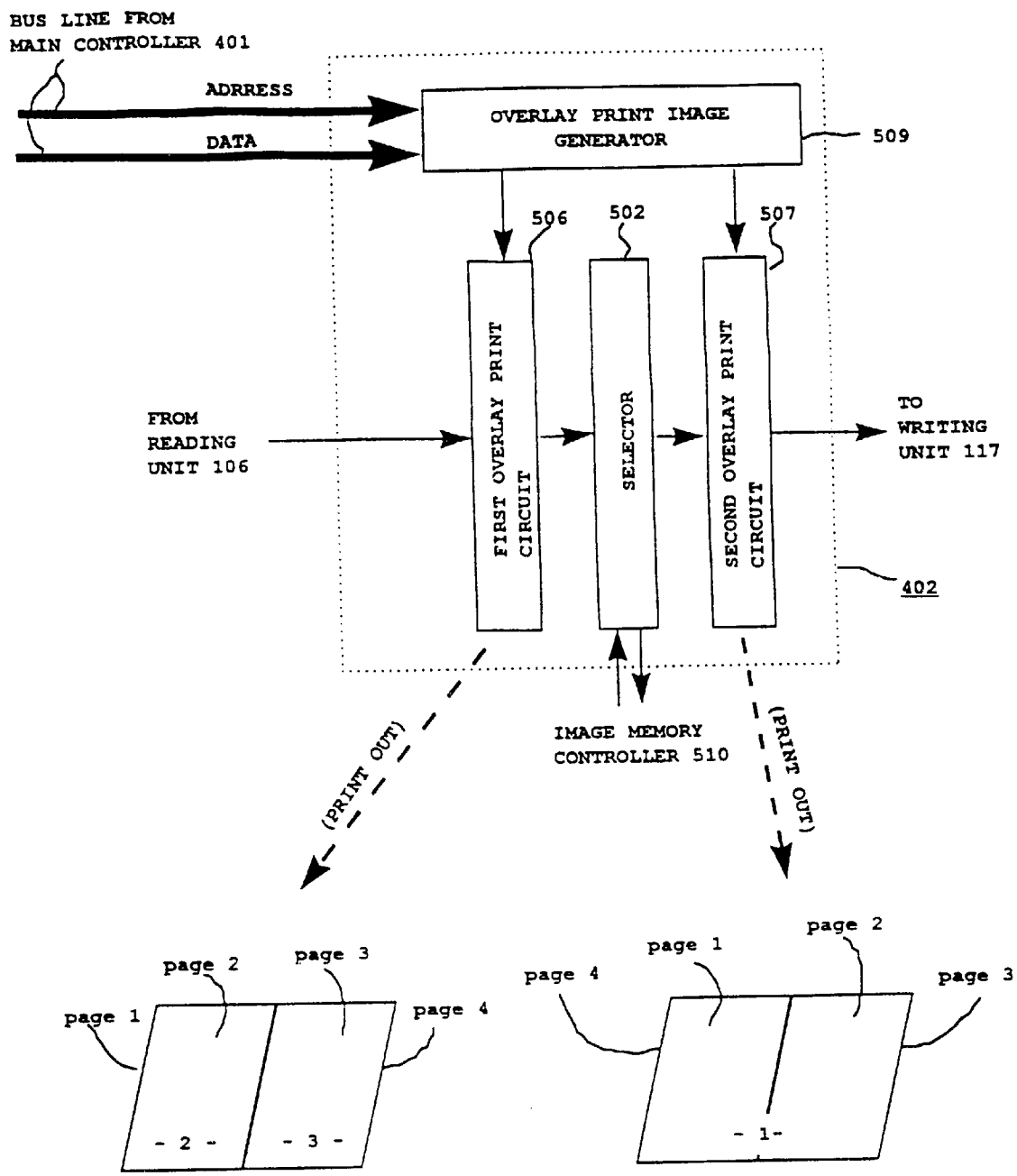
FIG. 9 is a block diagram explaining a sample set command circuit of the IPU.

In addition, an illustration shown in FIG. 9 is a case when the input side page-number print function is used during a time when an N-into-one function and a double sided print function, for example, are selected. The N-into-one function is a function for shrinking a plurality of pages into one page and is accordingly performed in a region before the image memory 501. The double sided print function is a function performed by using an image previously stored in the image memory 501. Therefore, the page-number print in the N-into-one mode and the double sided print mode, for example, is performed by the first overlay print circuit 506. FIG. 9 also shows that the output side page-number print function is used when the double sided print function, for example, is selected and when the N-into-one function is not selected. In this case, the page-number print with the double sided print functions, for example, is performed by the second overlay print circuit 507.

A stamp print function is used to print a company logo stamp, for example, on a page or pages of a document. A stamp print function includes two modes. One stamp print mode is performed on image data by the first overlay print circuit 506 which is located before the image memory 501. Accordingly, this stamp print mode can only be changed using new read data of an image and not using an image previously stored in the image memory 501 where the image is already edited by a sort function, as an example. This type of a stamp print mode may be referred to as an input side stamp print mode (i.e., input stamp print.) The input side stamp print mode is consequently grouped in the first group in Table 1 shown in FIG. 8. The other stamp print mode is performed on image data by the second overlay print circuit 507 which is located after the image memory 501. Accordingly, this stamp print mode can be changed using an image previously stored in the image memory 501. This type of a stamp print mode may be referred to as an output side stamp print mode (i.e., input stamp print.) The output side stamp print mode is consequently grouped in the second group in Table 1 shown in FIG. 8.

Figure 10:
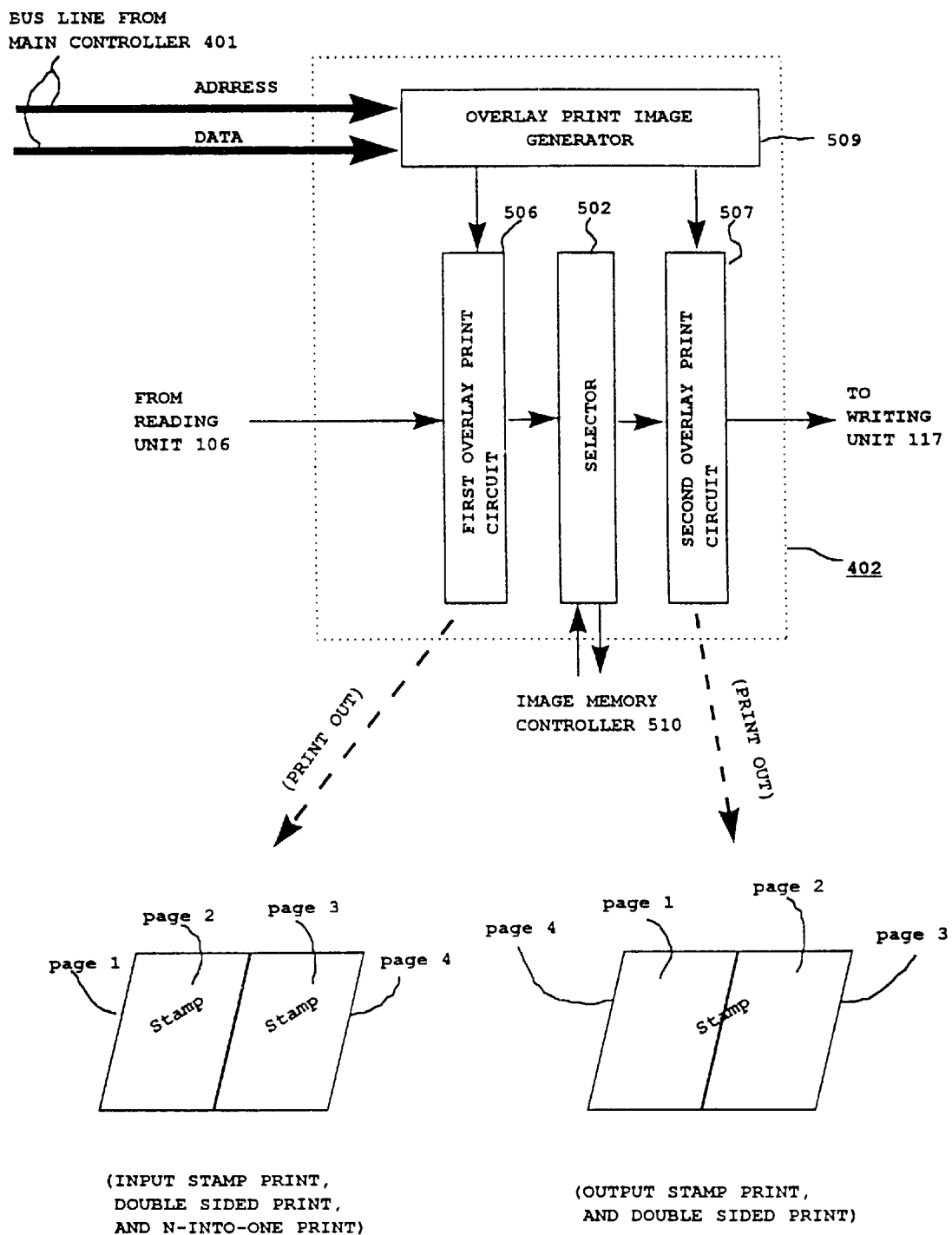
FIGS. 10 and 11 are illustrations explaining page-number print and stamp print functions, respectively.

An illustration shown in FIG. 10 is of a case when the input side stamp print function is used during a time when the N-into-one function and the double sided print function, for example, are selected. As described above, the N-into-one and double sided print functions are to be performed in the region of before and after the image memory 501, respectively. Therefore, the stamp print in the N-into-one mode and the double sided print mode, for example, is performed by the first overlay print circuit 506. FIG. 9 also shows that the output side stamp print function is used when the double sided print function, for example, is selected and wen the N-into-one function is not selected. In this case, the stamp print with the double sided print functions, for example, is performed by the second overlay print circuit 507.

A sort function changes a page order and a format of images stored in the image memory 501 in this embodiment. Therefore, the sort function always uses images previously stored in the image memory 501, regardless of whether or not the sort mode is changed. Accordingly, the sort mode is grouped in the second group in Table 1 shown in FIG. 8.

The double sided print function changes the paper tray selection which can be performed with no relationship with an image stored in the image memory 501. Therefore, the double sided print mode is grouped in the second group in Table 1 shown in FIG. 8.

Figure 11:
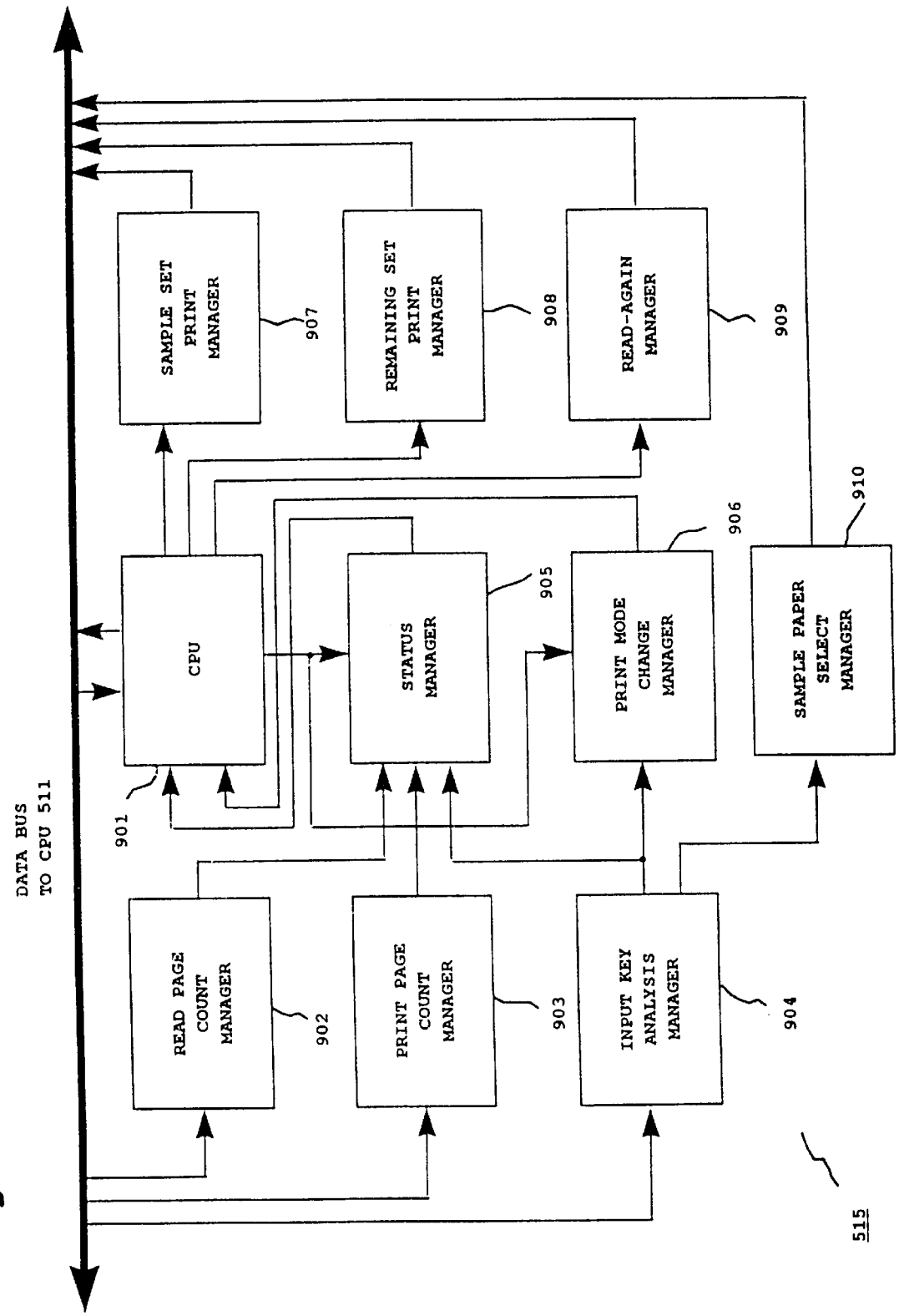

Next, an operation of the sample set command circuit 515 of the IPU 402 is explained with reference to FIG. 11. The sample set command circuit 515 includes a CPU 901 for controlling an entire operation of the sample set command in this embodiment. The control of the sample set command function is preferably performed by an independent CPU when a relatively high performance is desired. However, another CPU such as the CPU 511 of the IPU 402 can also execute the control of the sample set command instead of the CPU 511 although overall performance may be decreased.

The IPU 402 further includes various circuits:

an input page count manager 902 for counting and storing a present page count and a total page count of an original document;

an output print set count manager 903 for counting and storing an output print set count;

an input key analysis manager 904 for analyzing an input key through the operation panel unit 201, for detecting presses of each of the function keys registered in the first and second function groups and each of the command keys, such as the start key 202, the clear and stop key 203, the sample set command key 209, and so forth;

a status manager 905 for indicating various status such as whether a sample set command is valid or not, whether a read-again flag which is explained later is set at "1" (one) or "0" (zero), and a total set number instructed through the operation panel 201;

a print mode change manager 906 for storing functions of the first and second function groups and verifying an input key with the functions stored;

a sample set print manager 907 for performing an output of a sample set;

a remaining set print manager 908 for performing an output of remaining sets;

a read-again manager 909 for performing an operation of reading an original document once again; and a sample set paper select manager 910 for storing a paper tray number for multiple print sets instructed through the operation panel 201, paper size and format of an original document, and status of then available paper trays.

The CPU 901 communicates with these managers, the IPU 402, and the main controller 401.

Next, an operation of the novel image forming apparatus 100 when the sample set command key 209 of the operation panel unit 201 is pressed is explained with reference to FIGS. 12(a) and 12(b). A variable used in this flowchart is $X_1$ for representing a count number of sheets of an original document when it is handled by the ADF.

Figure 12A:
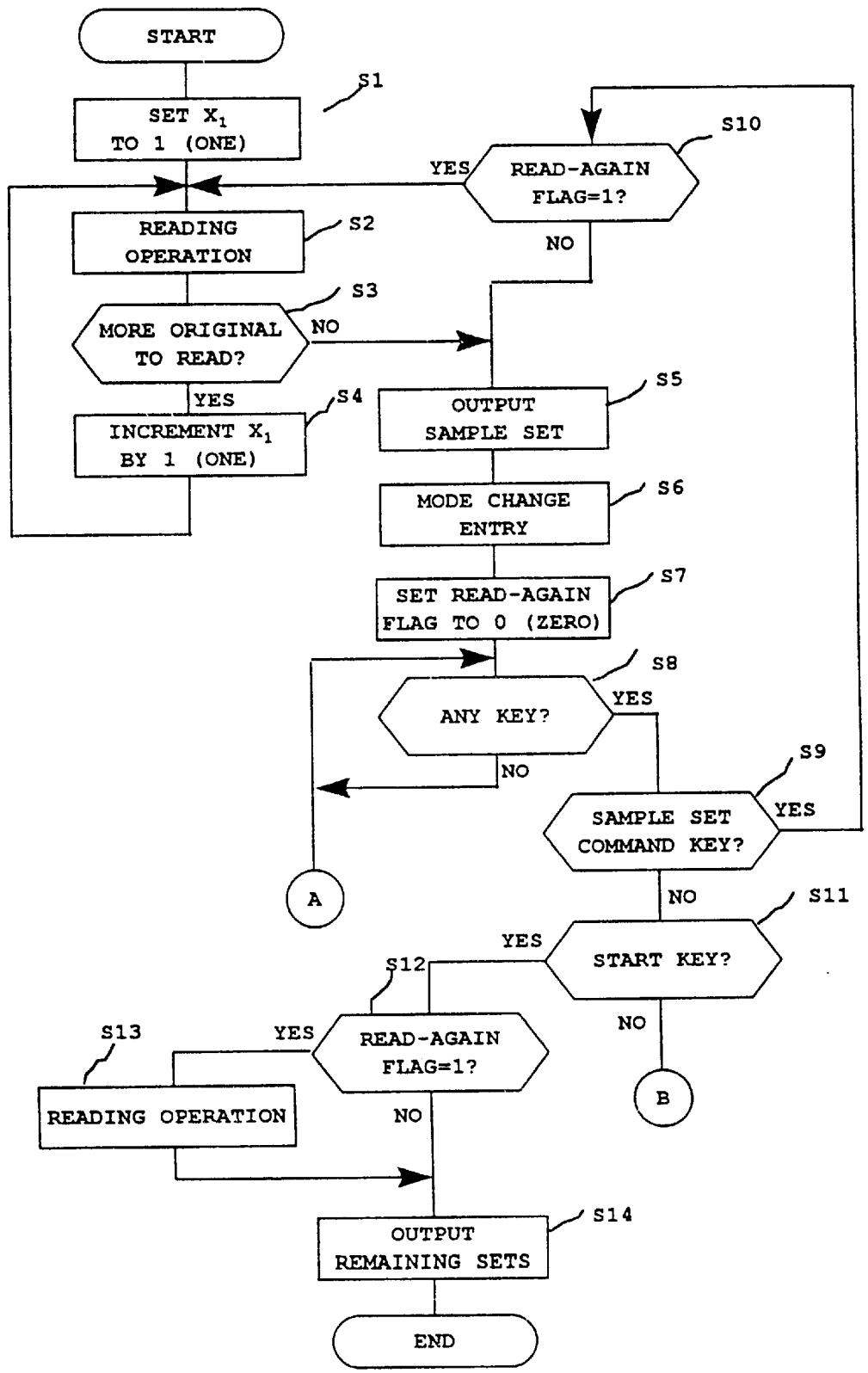
FIGS. 12(a) and 12(b) are flowcharts explaining an operation of how a repetitive reading operation can be avoided by the novel image forming apparatus.

Upon a press of the sample set command key 209 by an operator, the CPU 901 of the sample set command circuit 515 places value "1" (one) into $X_1$ in Step S1 so as to start to count a number of sheets of an original document, as shown in FIG. 12(a). Then, in Step S2, the CPU 901 executes a number of serial operations: requesting the main controller 401 to activate the ADF 101 to transfer a first sheet of the original document to a reading position of the CCD image sensor 138; instructing the reading unit 106 to read the first sheet set at the reading position; and then storing data of the read image into the image memory 501. Then, in Step S3, the CPU 901 requests the main controller 401 to check a signal from the original document sensor 108 of the ADF 101 indicating whether following sheet of the original document exists on the original document table 102 of the ADF 101.

If a result of Step S3 is YES (i.e., more originals exist to read,) the program proceeds to Step S4, in which the CPU 901 increments $X_1$ with value "1" (one). Then, the program is returned to Step S2 to read the following sheet. If the result of Step S3 is NO, the program is further proceeded to Step S5 in which a sample set of the original document is output. Then, upon an event of outputting the sample set, the CPU 901 accepts an entry of copy mode changes through the operation panel unit 201 by the operator, in Step S6. The CPU 901 then initializes the read-again flag to "0" (zero) in Step S7.

In Step S8, the CPU 901 requests the main controller 401 to check whether any key entry is made through the operation panel unit 201. In a case of NO in Step S8, the CPU 901 goes into a waiting mode for a key entry, with a check loop of Step S8. If YES in Step S8, the CPU 901 in Step S9 requests the main controller 401 to check whether the sample set command key 209 is again pressed.

If the sample set command key 209 is pressed again, a result of Step S9 becomes YES and the CPU 901 then checks, in Step S10, whether the read-again flag is set as "1" (one). When a result of Step S10 is YES, the program is returned to Step S2 to read the original document once again. However, when the result of Step S10 is NO, the program is returned to Step S5 so as to output a sample set without reading the original document once again.

If the sample set command key 209 is not pressed again, a result of Step S9 becomes NO and the program proceeds to Step S11 in which the CPU 901 requests the main controller 401 to check whether a start key 202 is pressed.

When the start key 202 is pressed, a result of Step S11 is YES and the program further proceeds to Step S12 in which the CPU 901 checks whether the read-again flag is set as "1" (one). At this time, if the read-again flag is set as "1" (one), the CPU 901 in Step S13 instructs the reading unit 106 to read the original document once again. Subsequently, the CPU 901 in Step S14 instructs the writing unit 117 and the units associated with the writing operation to output a second and subsequent copy sets. In a case when the read-again flag is not set as "1" (one), a result of Step S12 is NO and, in Step S14, the CPU 901 instructs the writing unit 117 and the units associated with the writing operation so as to output a second and subsequent copy sets without executing the reading operation once again. Then, the program of the sample set command for this case is ended.

When the start key 202 is not pressed, a result of Step S11 becomes NO and the program further proceeds to Step S15. In Step S15, the CPU 901 requests the main controller 401 to check whether a clear and stop key 203 of the operation panel unit 201 is pressed.

If a result of Step S15 is YES, the program proceeds to Step S16 in which the CPU 901 resets the modes into the default conditions. Then, the program of the sample set command for this case is ended. If a result of Step S15 is NO, the program proceeds to Step S17 in which the CPU 901 requests the main controller 401 to check whether the staple key 222 of the touch-sensing panel 206 on the LCD 205 is pressed.

When the staple key 222 is pressed and a result of Step S17 becomes YES, the program proceeds to Step S18. In Step S18, the CPU 901 establishes a stapling mode in accordance with the operator's instructions through the operation panel unit 201. After a completion of establishing the stapling mode, the program is returned to Step S8 so as to wait for a key entry. If the staple key 222 is not pressed and the result of Step S17 is NO, the program proceeds to Step S19 in which the CPU 901 requests the main controller 401 to check whether the page-number print key 223 of the touch-sensing panel 206 on the LCD 205 is pressed.

If the page-number print key 223 is pressed and a result of Step S19 is YES, the program proceeds to Step S20, in which the CPU 901 establishes a page-number print mode in accordance with the operator's instructions through the operation panel unit 201. After completion of establishing the page-number print mode, the program is returned to Step S8 so as to wait for a key entry. If the page-number print key 223 is not pressed and the result of Step S19 is NO, the program proceeds to Step S21 in which the CPU 901 requests the main controller 401 to check whether the stamp print key 226 of the touch-sensing panel 206 on the LCD 205 is pressed.

If the stamp print key 226 is pressed and a result of Step S21 is YES, the program proceeds to Step S22, in which the CPU 901 establishes a stamp print mode in accordance with the operator's instructions through the operation panel unit 201. After completion of establishing the stamp print mode, the program is returned to Step S8 to wait for a key entry. If the stamp print key 226 is not pressed and the result of Step S21 is NO, the program proceeds to Step S23 in which the CPU 901 requests the main controller 401 to check whether the sort key 221 of the touch-sensing panel 206 on the LCD 205 is pressed.

If the sort key 221 is pressed and a result of Step S23 is YES, the program proceeds to Step S24, in which the CPU 901 establishes a sort mode in accordance with the operator's instructions through the operation panel unit 201. After a completion of establishing the sort mode, the program is returned to Step S8 to wait for a key entry. If the sort key 221 is not pressed and the result of Step S23 is NO, the program proceeds to Step S25 in which the CPU 901 requests the main controller 401 to check whether the double sided print key 224 of the touch-sensing panel 206 on the LCD 205 is pressed.

If the double sided print key 224 is pressed and a result of Step S25 is YES, the program proceeds to Step S26, in which the CPU 901 establishes a double sided print mode in accordance with the operator's instructions through the operation panel unit 201. After a completion of establishing the double sided print mode, the program is returned to Step S8 to wait for a further key entry. If the double sided print key 224 is not pressed and the result of Step S25 is NO, the program proceeds to Step S27 in which the CPU 901 requests the main controller 401 to check whether any mode key other than the clear and stop key 203, the staple key 222, the page-number print key 223, the stamp print key 226, the sort key 221, or the double sided print key 224 is pressed.

If any key other than the above-mentioned keys is pressed and a result of Step S27 is YES, the program proceeds to Step S28. In Step S28, the CPU 901 establishes a mode in accordance with the operator's instructions. Then, the CPU 901 sets the read-again flag to value "1" (one) in Step S29, and the program is returned to Step S8 to wait for a further key entry.

In such a manner as mentioned above, the novel image forming apparatus 100 operates the sample set command function when the sample set command key 209 of the operation panel unit 201 is pressed.

Next, a detailed operational flow of establishing the staple mode indicated as Step S18 in FIG. 12(b) (i.e., the staple mode set procedure) is explained with reference to FIG. 13. Variables used in this flowchart are $X_1$ used in the previous flowchart and $X_2$ representing a count number of output for the staple function.

Figure 13:
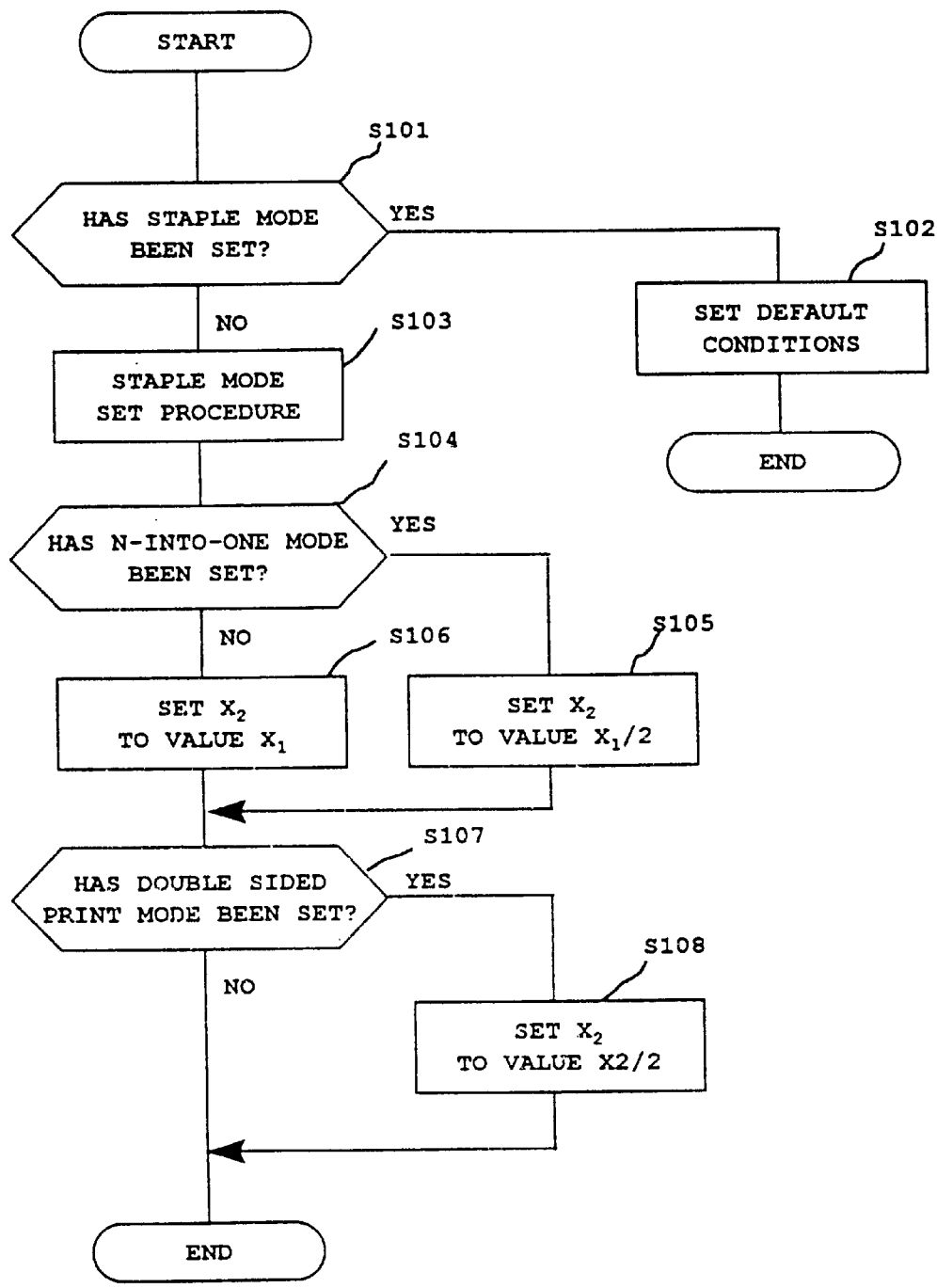
FIG. 13 is a flowchart explaining details of a staple mode set-up procedure indicated in the flowchart shown in FIG. 12(b)

In Step S101 in FIG. 13, the CPU 901 checks whether the staple mode is previously established. If the staple mode is previously established and a result of Step S101 is YES, the CPU 901 resets a number of staples and positions of staples in Step S102. Then, the process of this program is ended. If the staple mode is not previously established and the result of Step S101 is NO, the CPU 901 in Step S103 establishes the staple mode such as a number and positions of the staples in accordance with the operator's instructions.

Subsequently, the CPU 901 in Step S104 checks whether the N-into-one mode is established. If the N-into-one mode is established and a result of Step S104 is YES, the program proceeds to Step S105 in which the CPU 901 determines how many sheets are needed for one copy set in order to establish a timing for execution of stapling. At this time, the number of the sheets needed for one copy set is determined by dividing the total number of the original document, which is stored in $X_1$, by number N which represents a number of pages of the original document to be combined into one page. A resultant number is substituted into $X_2$. When the N-into-one mode is not established and the result of Step S104 is NO, the CPU 901 determines the number of sheets needed for one copy set by applying the total number of the sheets of the original document as it is stored in $X_1$. A resultant number is substituted into $X_2$.

Then, the program proceeds to Step S107 in which the CPU 901 checks whether the double sided print mode is set. If the double sided print mode is not established, the process of this program ends. However, if the double sided print mode is established and the result of Step S107 is YES, the program proceeds to Step S108 in which the CPU 901 determines how many sheets are needed for one copy set in order to establish a timing for execution of stapling. At this time, the number of sheets needed for one copy set is determined by dividing the total number of the output sheets, which is stored in $X_2$, by a number of two which represents that two pages of the original document are printed on both sides of one output sheet. A resultant number is stored into $X_2$.

In this way, an execution timing of stapling in the above-mentioned cases is determined by comparing a number of the sheets needed for one copy set and a number of ejected sheets which is stored in the counter $X_2$.

Figure 12B:
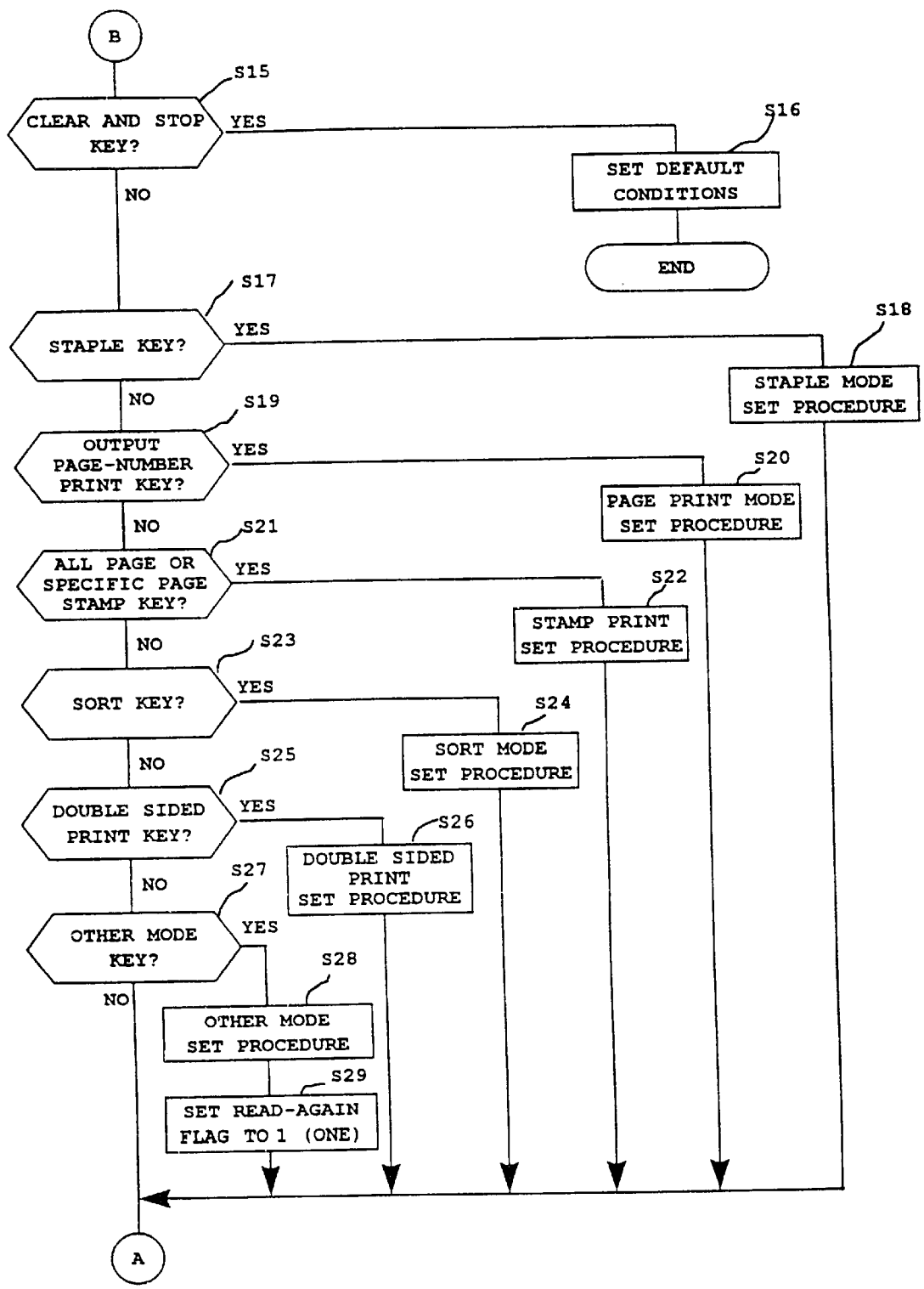

Next, a detailed operational flow of establishing the page-number print mode indicated as Step S20 in FIG. 12(b) is explained with reference to FIG. 14. Variables used in this flowchart, in addition to $X_1$ used in the previous flowchart, are $X_3$ and $X_4$ representing ending and starting pages of the page-number print function, respectively.

Figure 14:
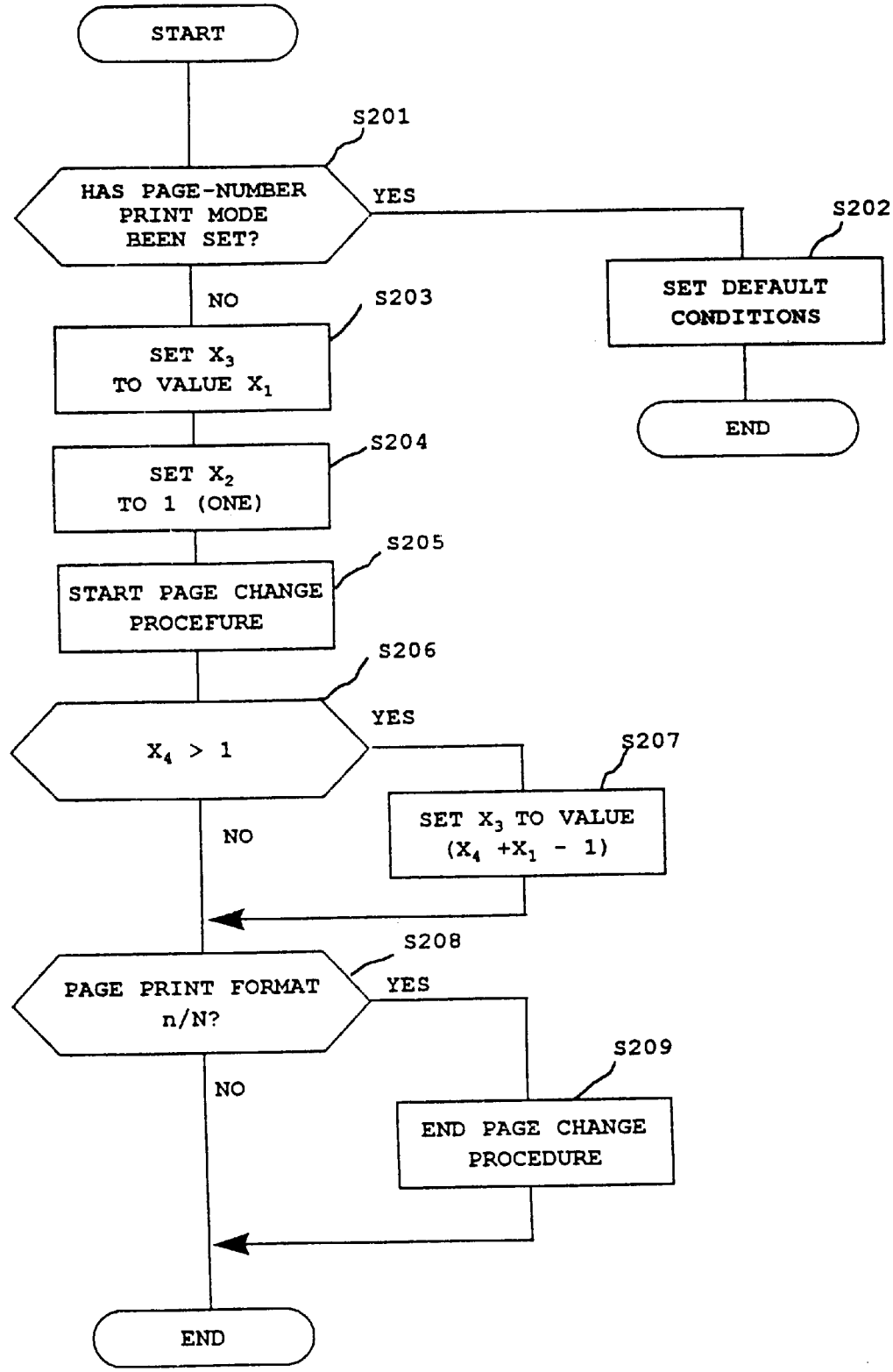
FIG. 14 is a flowchart explaining details of a page-number print mode set-up procedure indicated in the flowchart shown in FIG. 12(b)

In Step S201 in FIG. 14, the CPU 901 checks whether the page-number print mode is previously established. If the page-number print mode is previously established and a result of Step S201 is YES, the CPU 901 resets numbers of starting and ending pages for the page-number print operation in Step S202. Then, the process of this program ends. If the page-number print mode is not previously established and the result of Step S201 is NO, the CPU 901 in Step S203 determines a default value for an ending page of the page-number print operation by copying a number of sheets of the original document stored in $X_1$ to $X_3$ representing an ending page of the page-number print function. Then, in Step S204, the CPU 901 also determines a default value for a starting page of the page-number print function by substituting "1" (one) to $X_4$.

Subsequently, the program proceeds to Step S205 in which the CPU 901 executes a program for changing a starting page in accordance with the operator's instructions. In the event that the present starting page is changed with a new starting page, the CPU 901 resets $x_4$ with the new starting page which becomes a present starting page. Then, the program proceeds to Step S206 in which the CPU 901 checks whether a number of the starting page is changed. In this case, the CPU 901 performs the check by determining whether a number of the starting page stored in $X_4$ is equal to value "1" (one) or not. When the CPU 901 determines that the starting page is changed, the program proceeds to Step S207 in which the CPU 901 corrects the number of the ending page by calculating a difference between the previous starting page and the present stating page and adding the difference to $X_3$.

Then, the program proceeds to Step S208 in which the CPU 901 executes a program for performing the page-number print in a form of "n/N" in which n is a page-number print and N is a total page-number print. If the "n/N" form is not selected and a result of Step S208 is NO, the program is ended. If the "n/N" form is selected and the result of Step S208 is YES, the program proceeds to Step S209 in which the CPU 901 executes a process of the ending page in a form of "n/N."

Next, a detailed operational flow of establishing the stamp print mode indicated as Step S22 in FIG. 12(b) is explained with reference to FIG. 15. Variables used in this flowchart, in addition to $X_1$ used in the previous flowchart, are $X_5$, $X_6$, $X_7$, and $X_8$. A total sheet number of an original document is represented by $X_5$. A flag indicating the all-page stamp function is represented by $X_6$. A page number counted from the last page for the specific page stamp function is represented by $X_7$. A specific page number input for the specific page stamp is represented by $X_8$.

Figure 15:
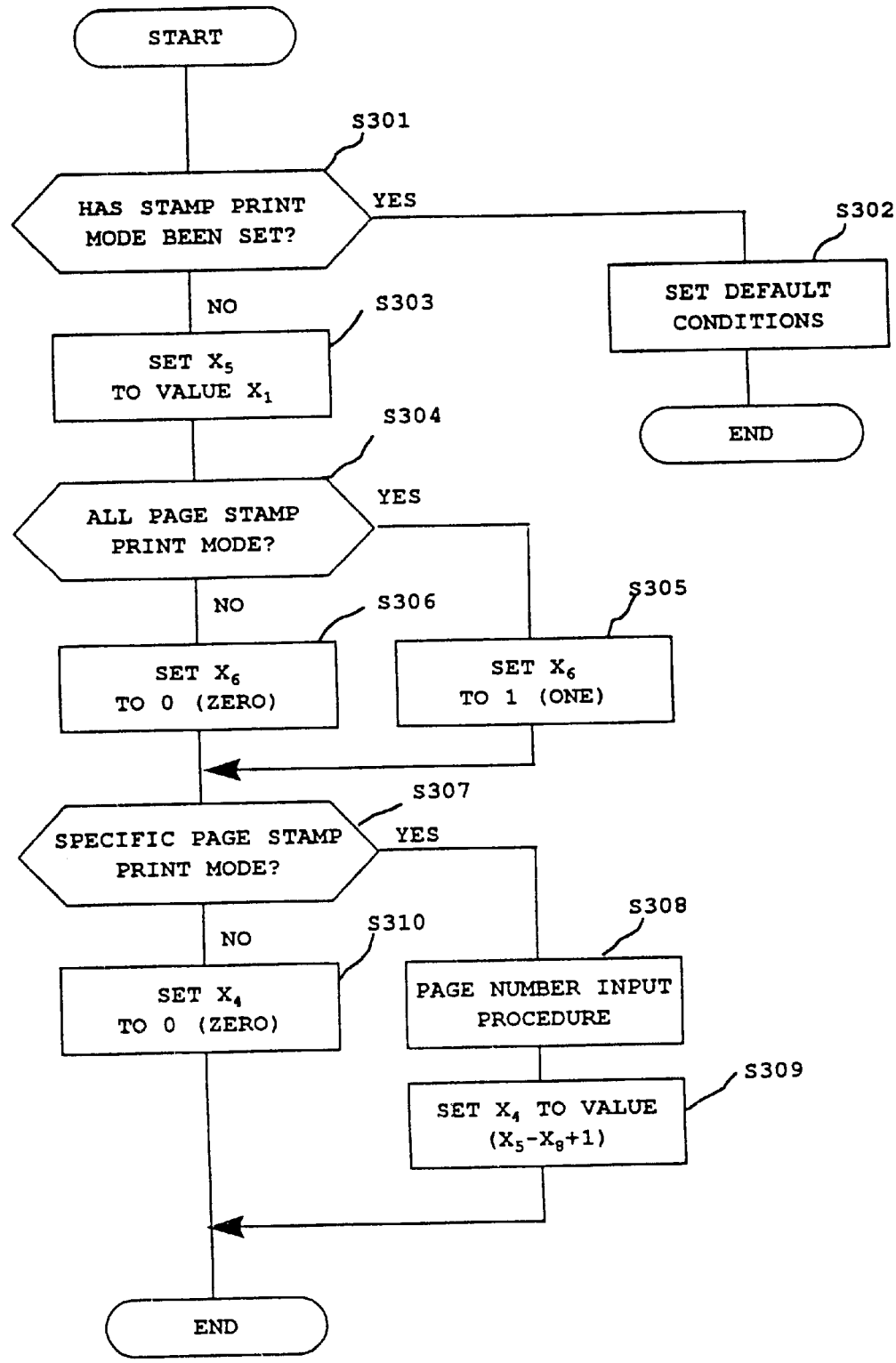
FIG. 15 is a flowchart explaining details of a stamp print mode set-up procedure indicated in the flowchart shown in FIG. 12(b)

In Step S301 in FIG. 15, the CPU 901 checks whether the stamp print mode is previously established. If the stamp print mode is previously established and a result of Step S301 is YES, the CPU 901 resets parameters for the stamp print operation in Step S302. Then, the process of this program is ended. If the stamp print mode is not previously established and the result of Step S301 is NO, the program proceeds to Step S303 in which the CPU 901 determines a number of total sheets of an original document by copying the number of the original document stored in $X_1$. A resultant number is stored in $X_5$. At this time, if the stamp print function is used in the N-into-one mode, a number of total sheets of the original document is equal to a number which is obtained by dividing the number of the original document stored in $X_1$ by number "N."

Then, in Step S304, whether a mode of the stamp print on all pages is selected is determined. When the mode of the stamp print on all pages is selected and a judgment of Step S304 is YES, the CPU 901 proceeds to Step S305 in which $X_6$ as an all-page stamp print flag is set to value "1" (one). If NO in Step S304, $X_6$ as the all-page stamp print flag is set to value "0" (zero).

Then, in Step S307, whether a mode of the stamp print on selected pages is chosen is determined. When the mode of the stamp print on the selected pages is chosen and a judgment of Step S307 is YES, the CPU 901 proceeds to Step S308 in which an entry of a selected page by the operator is processed and then the selected page is stored into $X_8$ as an input page. In the following Step S309, a stamp print page-number counted from the last sheet of the output set is calculated using values of X5 and X8 and stored into $X_7$. Then, the flow of this program is ended. When the mode of the stamp print on the selected pages is not chosen and the judgment is NO, the CPU 901 further proceeds to Step S310 in which a process of writing value "0" (zero) into $X_7$ is performed. Then, the flow of this program is ended.

As described above, the thus configured novel image forming apparatus 100 is capable of outputting an image by reading image data previously stored in the image memory 501 without executing an operation of reading an original document once again, when an image forming mode having no conflict with the previously set reading conditions is changed when a sample set of the original document is output during the sample set command mode. Further, this novel image forming apparatus 100 is capable of determining an execution of an operation of reading an original document once again before outputting an image, only in a case when an image forming mode having a conflict with the previously set reading conditions is changed when a sample set of the original document is output during the sample set command mode. In this way, the thus arranged sample set command mode can be efficiently used having a great merit that the operator's hand process such as resetting an original document into the ADF and also damage to the original document may be minimized.

Next, a feature of the novel image forming apparatus 100 having a sample set command function is explained. This novel image forming apparatus 100 is capable of selecting a paper tray at the highest productivity, during a time of outputting a sample set, on the basis of positions of paper trays and paths of transfer paper sheets regardless of which paper tray has previously been designated.

In the novel image forming apparatus 100 as shown in FIG. 1, there are differences in transfer path lengths between the first, second, and third paper trays 109, 110, and 111 and, accordingly we may define speed of paper transferring by these paper trays as ($PT_1 > PT_2 > PT_3$). In this case, $PT_1$, $PT_2$, and $PT_3$ represent speed of the paper transferring by the first, second, and third paper trays 109, 110, and 111, respectively. When a so-called large capacity paper tray (LCT) is optionally installed, the LCT may have a different productivity depending upon where it is installed. However, it is supposed that a relationship of productivity between the LCT and the three paper trays is defined as ($PT_1\ PT_2 > PT_3 > LCT$).

It is also supposed that the paper transferring in the portrait format is faster than that in the landscape format. In this case, the portrait format is defined as the longitudinal side of the paper perpendicular to the paper transferring direction and the landscape format is defined as the longitudinal side of the paper parallel to the paper transferring direction.

Under the above-mentioned conditions, a designated paper tray is registered in the memory when the start key 202 of the operation panel unit 201 is pressed during the sample set command mode. Then, a sheet of the original document is transferred to the reading position on the contact glass by the ADF 101. At this time, a size of the original document is detected by the size detect sensor mounted in the ADF 101. Then, the CCD image sensor 138 reads an image of the original document and then data of the read image is stored into the image memory 501. Upon a completion of the image reading operation, an operation of outputting a sample set of the original document starts and a transfer paper sheet is transferred from one of the paper trays so as to have an image formed thereon.

Figure 16A:
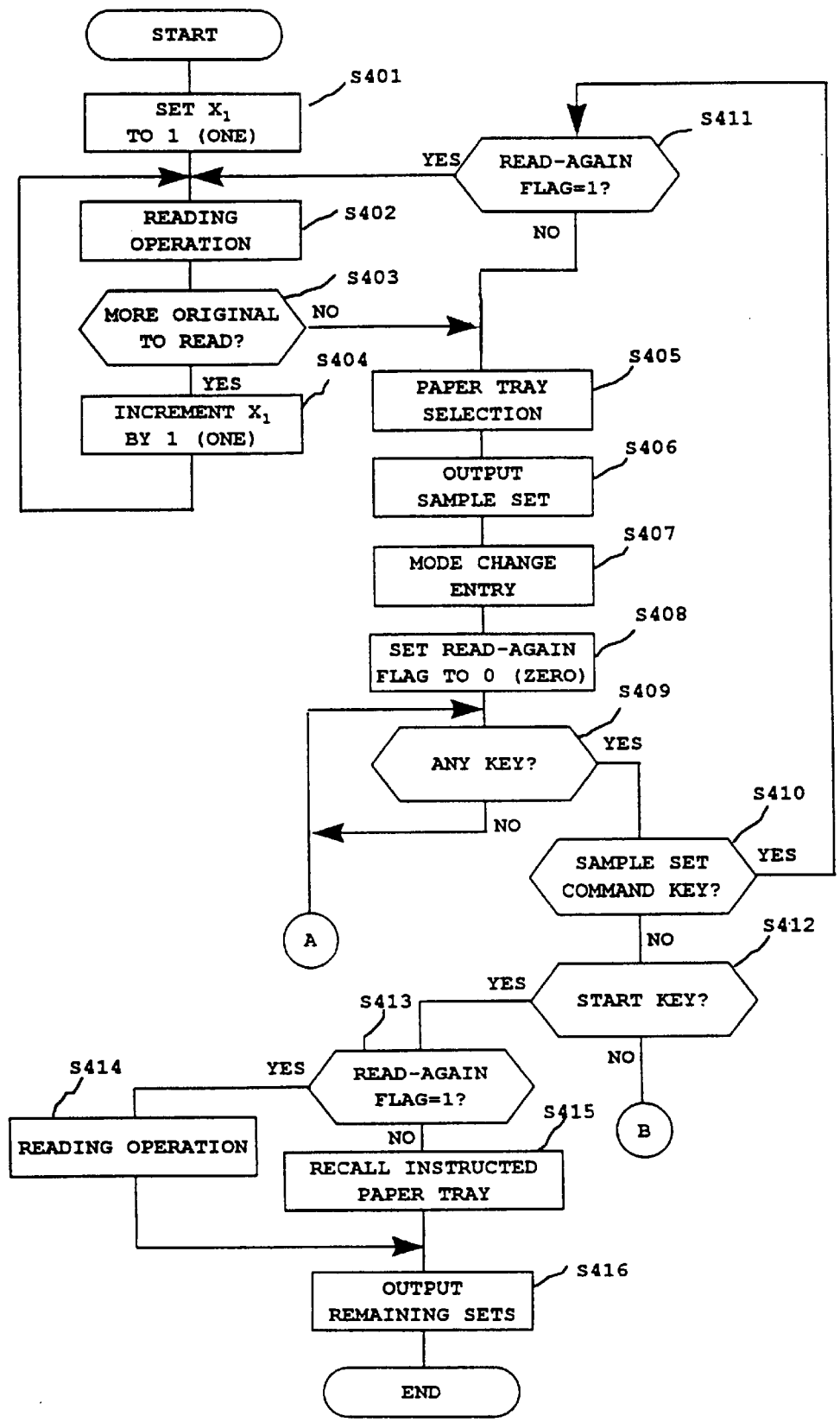
FIGS. 16(a), 16(b), 17, and 18 are flowcharts explaining how a sample set can choose a paper tray of highest productivity in a first modified embodiment.
Figure 16B:
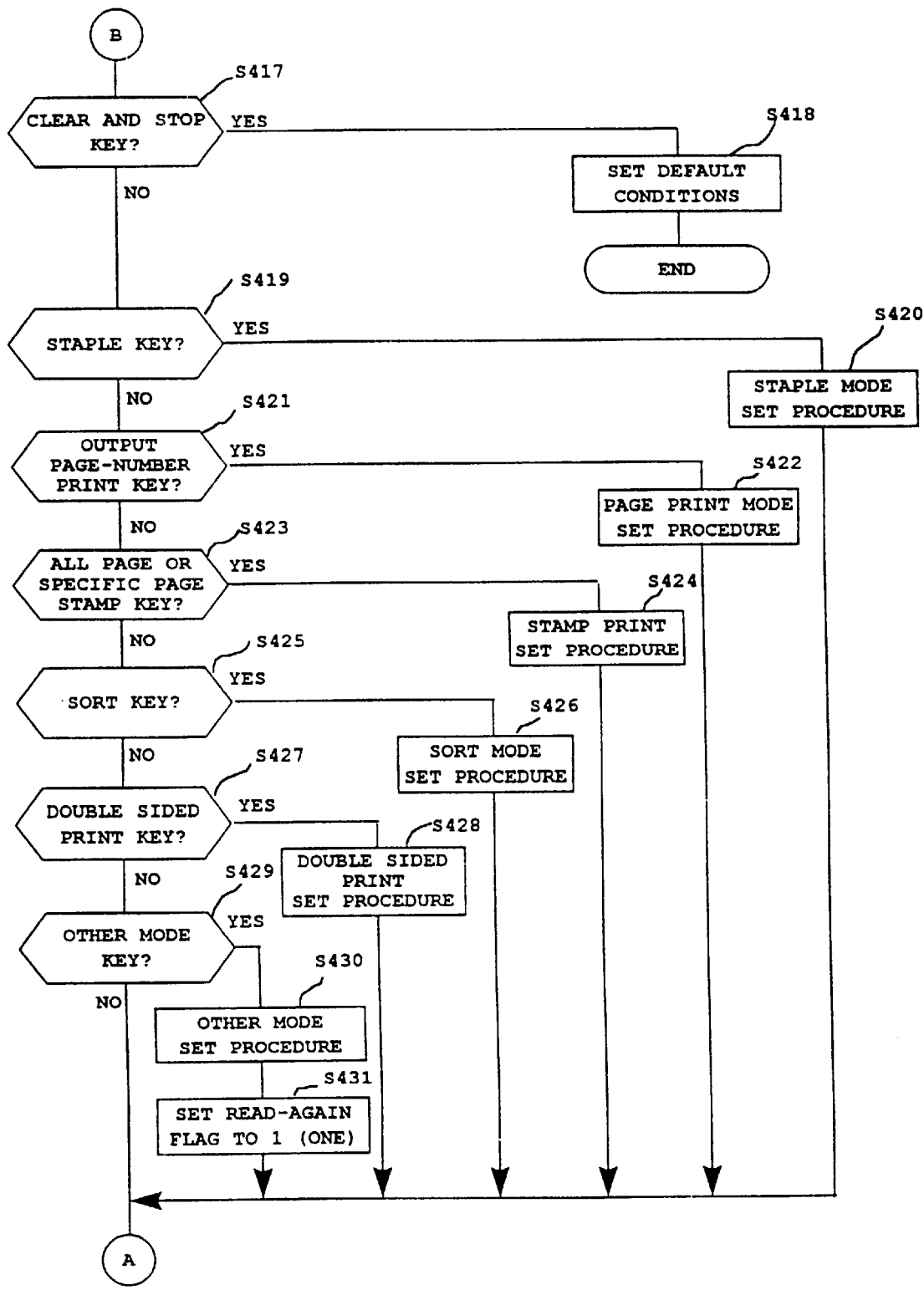

A detailed operation of the above-mentioned paper tray selection during the sample set command mode is explained with reference to FIGS. 16(*a*), 16(*b*), 17, and 18. FIG. 16(*a*) is similar to FIGS. 12(*a*), except for processes of the paper tray selection, Steps S405 and S415, added to FIG. 16(*a*). Since a flowchart shown in FIG. 16(*b*) connecting to the flowchart shown in FIG. 16(*a*) is exactly same as the flowchart shown in FIG. 12(*b*), an explanation is omitted.

When the sample set command key 209 is pressed, a reading operation is performed by Steps S401–S404. Then, the paper tray selection operation is performed in Step S405. In this paper tray selection operation, a paper tray at the highest productivity is selected on the basis of the positions of the paper trays and paper formats. In this case, the paper transfer in the portrait format from the first paper tray is of the highest productivity and is so selected in Step S405.

Then, upon a completion of outputting the sample set in Step S406, a mode change by the operator via the operation panel unit 201 is subsequently allowed in Step S407. In Step S408, the read-again flag is reset. Then, in Step S409, the program goes into a key entry waiting state. When any key is entered in Step S409, a press of the sample set command key 209 is checked in Step S410. If an answer for Step S410 is YES, in Step S411, the read-again flag is checked if it is set at "1" (one). When an answer for Step S411 is YES, the program is returned to Step S402. When the answer for Step S411 is NO, the reading operation is not executed and the program is returned to Step S405.

When no press of the sample set command key 209 is detected in Step S410, a press of the start key 202 is further checked in the Step S412. If YES in Step S412, the read-again flag is checked, in Step S413, to determine if it is set at "1" (one). If YES in Step S413, the reading operation is performed once again in Step S414. If NO in Step S413, the program proceeds to Step S415. In Step S415, the paper tray automatically selected for the sample set is canceled and the paper tray previously selected by the operator is recalled. Then, in Step S416, further copy sets following the sample set are output using the recalled paper tray selected by the operator.

Figure 17:
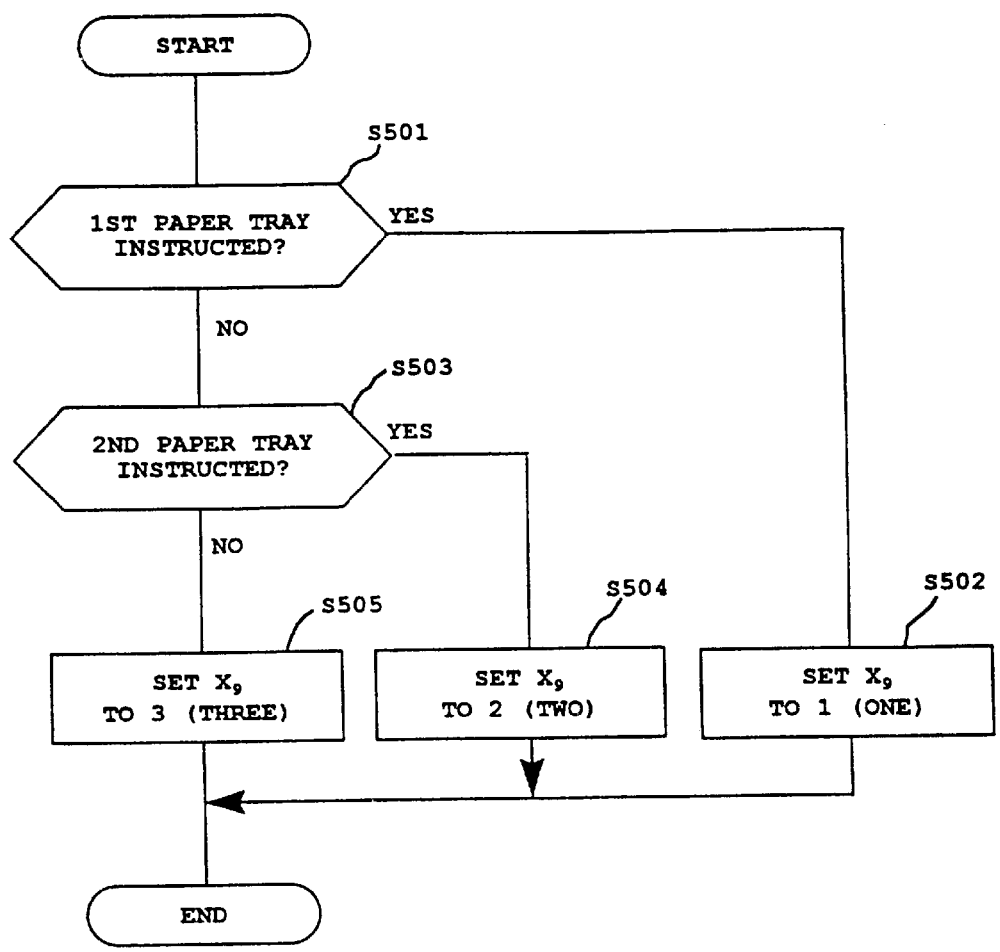

Next, a further detail of the paper tray selection operation shown as Step S405 in FIG. 16(*a*) is explained with reference to FIGS. 17 and 18. In particular, a flowchart of FIG. 17 shows a procedure for determining to which range of the paper trays is needed to be searched in order to improve the productivity on the basis of the paper tray selected by the operator. In this flowchart, variable $X_9$ for representing a paper tray number is used.

Since a number of selectable paper trays is defined from the first paper tray to the third paper tray, the paper tray number $X_9$ is set to "3" when the third paper tray is selected and also when the LCT is selected by the operator.

In Step S501, the CPU 901 checks whether the selected paper tray for the electric sort mode is the first paper tray. When the selected paper tray is the first paper tray and an answer of Step S501 is YES, the CPU 901 proceeds to Step S502 in which the CPU 901 places value "1" (one) into $X_9$. When the selected paper tray is not the first paper tray and the answer of Step S501 is NO, the CPU 901 proceeds to Step S503 in which the CPU 901 checks whether the selected paper tray for the electric sort mode is the second paper tray. When the selected paper tray is the second paper tray and an answer of Step S503 is YES, the CPU 901 proceeds to Step S504 in which the CPU 901 places value "2" (two) into $X_9$. When the selected paper tray is not the second paper tray and the answer of Step S503 is NO, the CPU 901 proceeds to Step S505 in which the CPU 901 places value "3" (three) into $X_9$. Upon a completion of placing a predetermined number into $X_9$ in the above-mentioned way, the operation flow of this program is ended.

Figure 18:
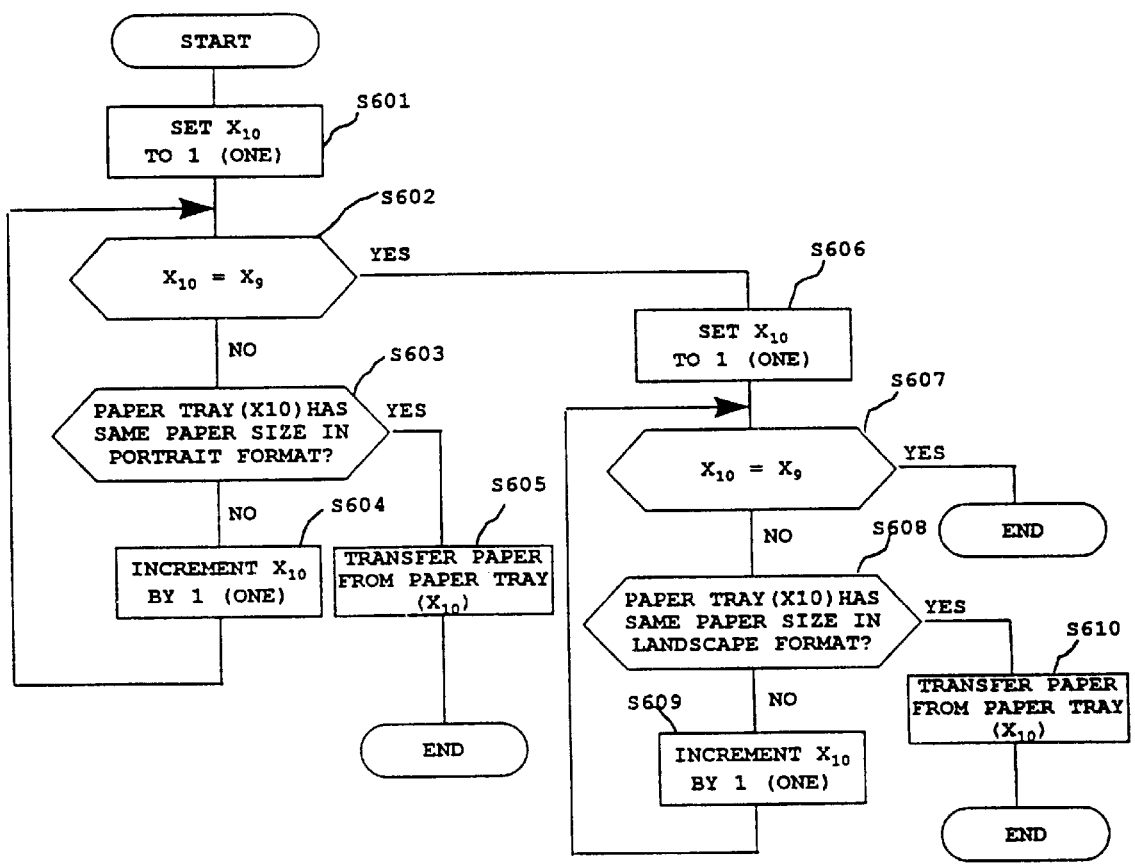

A flowchart of FIG. 18 shows a procedure for determining how a paper tray selection is performed within the number defined by a value placed in $X_9$ which is determined in the procedure shown in FIG. 17. Variables $X_{10}$ is used in this flowchart, in addition to variable $X_9$. Variable $X_{10}$ represents a count number indicating how many times of searching for a relatively faster paper tray is made.

In Step S601, the CPU 901 sets a search count number by placing value "1" (one) to $X_{10}$. Then, in Step S602, the CPU 901 checks whether values of the search count number in $X_{10}$ and the paper tray number in $X_9$ are equal or not. When the values are not equal and an answer of Step S602 is NO, the CPU 901 proceeds to Step S603 and there checks whether the paper tray designated by the search count number in $X_{10}$ has the paper size, designated by the operator, in the portrait format. If a result of Step S603 is NO, the CPU 901 proceeds to Step S604 and adds a value "1" (one) to $X_{10}$ in Step S604. If the result of Step S603 is YES, the CPU 901 proceeds to Step S605 and there sets the paper tray by the search count number. Then, the operation flow of this program is ended.

When the values are equal and the answer of Step S602 is YES, the CPU 901 proceeds to Step S606 and places value "1" (one) to $X_{10}$. Then, in Step S607, the CPU 901 checks whether the search count number and the selected paper tray number are equal or not. When an answer of Step S607 is YES, the CPU 901 ends the operation of this program. When the answer of Step S607 is NO, the CPU 901 proceeds to Step S608 and there checks whether the paper tray designated by the search count number in $X_{10}$ has the paper size, designated by the operator, in the landscape format. If an answer of Step S608 is NO, the CPU 901 proceeds to Step S609 and there adds value "1" (one) to $X_{10}$. If the answer of Step S608 is YES, the CPU 901 proceeds to Step S610 and there sets the paper tray by the search count number. Then, the operation flow of this program is ended.

By the above-mentioned procedure, the novel image forming apparatus 100 can output the sample set using the paper tray of the highest productivity which is automatically selected among the operable paper trays, and recalls the paper tray number previously selected by the operator upon a completion of outputting the sample set so as to be ready for outputting the following output sets using the paper tray previously selected by the operator. Upon receiving a press of the start key 202 by the operator, the novel image forming apparatus 100 outputs the following output sets after the sample set using the paper tray previously selected by the operator.

In this way, the novel image forming apparatus 100 is capable of selecting the paper tray of the highest productivity when outputting a sample set during the sample set command mode, and can accordingly provide the operator with a sample set in a relatively short time.

Next, another feature of the novel image forming apparatus 100 having a sample set command function is explained in detail. This novel image forming apparatus 100 is capable of automatically performing an operation of reading all the pages of an original document before outputting the sample set of the original document, when an image overlay print function such as the page-number print mode is selected in the simplex print mode during the sample set command mode.

For convenience sake, this operation of reading all the pages of an original document before outputting the sample set of the original document may be called a first-read-all operation, and another reading method, in which a read and a print are made in turn page by page, may be called a page-by-page-read operation.

Making copies in a double sided print format from a multiple page document in a single sided print format using an electric sorting on a copying machine may be an example of ordinary applications of the copying machine. In this application of the copying machine, the first-read-all operation may be required, particularly, when the double sided print paper tray uses a last-in-first-out system. This is because a page order of the original document is changed to another page order to perform a copying in the double sided print format. For example, when an original document in the single sided print format having 6 pages, each in 1 sheet, is read on a copying machine to make a double sided copy, an order of reading the original document on the copying machine may mostly be from the 1st through to the 6th page. In this case, images of the 2nd, 4th, and 6th pages in this order are transferred to three paper sheets and, then, these three paper sheets are stacked in the double sided print tray. Then, images of the 5th, 3rd, and 1st pages in this order are transferred to the three sheets stacked in the double sided print tray so that the 1st page is placed on top when the three sheets are ejected into the eject tray.

On the contrary, when the above-mentioned copies are made in a single sided print format, the page-by-page-read operation may generally be used, instead of the first-read-all operation. This may become obvious, particularly, when the ADF feeds the sheets of the original document in an order from the 6th through to 1st page. This is because a page order of the original document is not necessarily changed to any other page order. Therefore, upon a completion of reading all pages of the original document, an operation of outputting a sample set is ended.

However, there are exceptional cases in the above-mentioned applications of making copies in a single sided print format, which may require an operation other than the simple page-by-page-read operation. As a first example, making copies in a single sided print format using functions of the electric sorting and also the page-number print in an "n/N" format is of a usual application but can not be made by the simple page-by-page-read operation. This is because the page-number print in the "n/N" format requires the copying machine to know a total page number before starting an image forming operation. As a second example, making copies in a single sided print format using the ADF transferring sheets of the original document in an order from the last page through to the first page and also the page-number print function in an "n" or "n/N" format is also of a usual application but can not be made by the simple page-by-page-read operation. This is because the ADF firstly feeds the last page on which the last page number is required to be printed by the page-number print function. As a solution for these cases, the background copying machine normally request an operator to input the total page number before starting a reading operation.

Next, an operation of making multiple copy sets in the single sided print format during the first-copy-check mode by the novel image forming apparatus 100 is explained with reference to FIGS. 19 and 20. A flowchart shown in FIG. 19 explains how an operation of making multiple copy sets may be processed. In this flowchart, variable $X_1$ is used as a counted number of sheets of the original document.

Figure 19:
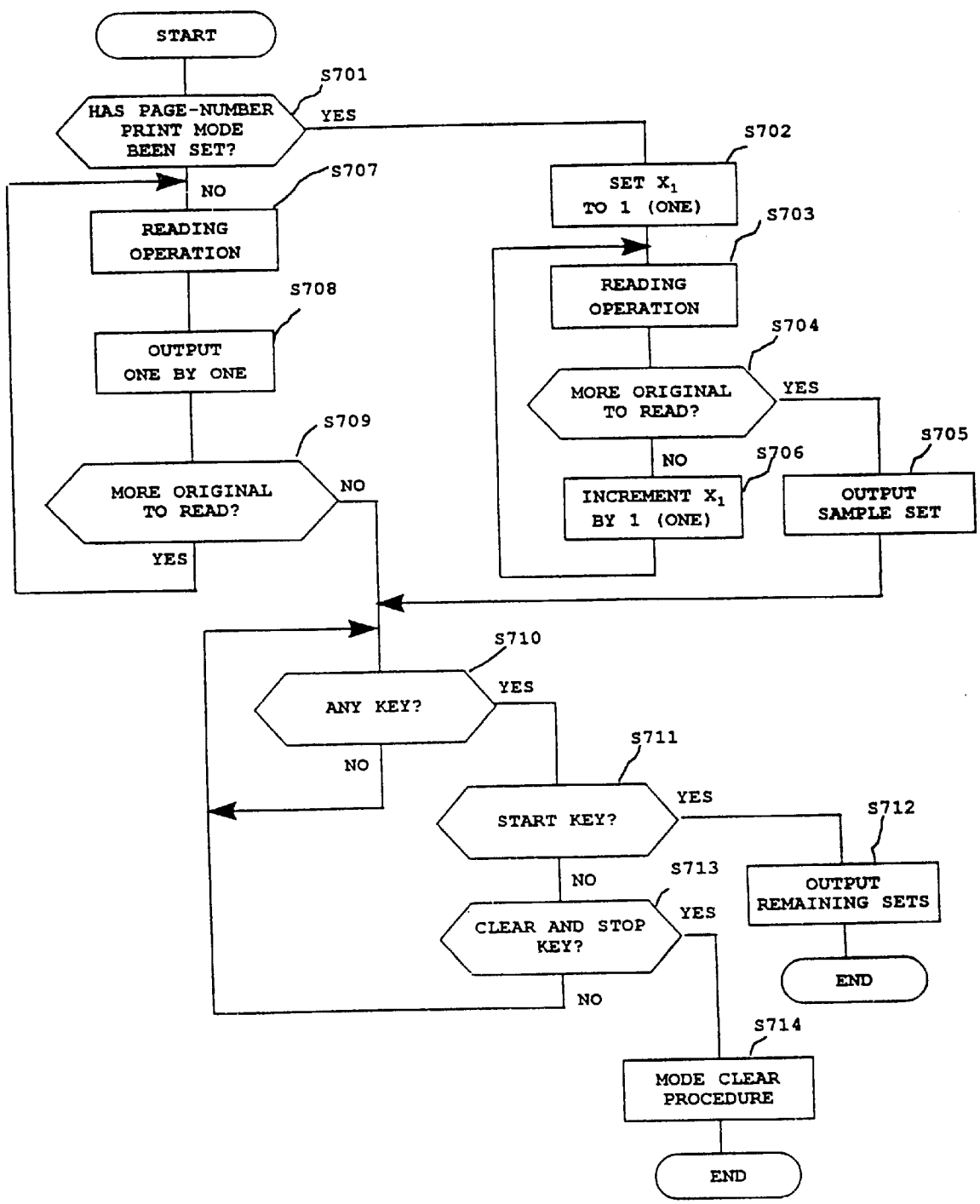
FIGS. 19 and 20 are flowcharts explaining an operation of an image forming made on one side of a transfer paper sheet.

In Step S701 of the flowchart shown in FIG. 19, the CPU 901 checks whether the page-number print mode is established. When the page-number print mode is established and a result of Step S701 becomes YES, the CPU 901 proceeds to Step S702 in which the CPU 901 substitutes a value of "1" (one) to $X_1$. In Step S703 following Step S702, a reading operation inclusive of transferring and reading the original document, and storing read image data into the image memory 501 is performed.

In Step S704 following Step S703, whether the sheets of the original document have been all transferred for the reading operation is checked by using the original document detect sensor 108. If the sheets of the original document have been all transferred and an answer of Step S704 becomes YES, a sample set is output in Step S705. If not all of the sheets of the original document have been transferred and the answer of Step S704 becomes NO, the CPU 901 adds value "1" (one) to $X_1$ in Step S706 and returns the program to Step S704 so as to execute a next reading operation.

When the page-number print mode is not established and a result of Step S701 becomes NO, the CPU 901 proceeds to Step S707 in which a reading operation is performed. In Step S708 following Step S707, an image transferring operation is performed to output a page which is a part of a sample set, in synchronism with the reading operation by the reading unit 106. In next Step S709 following Step S708, whether all of the sheets of the original document have been transferred for the reading operation is checked by using the original document detect sensor 108. If sheets remain to be transferred and a result of Step S709 is YES, the CPU 901 return the program to Step S707 to execute a next reading operation.

When the sheets of the original document have all been transferred and the answer of Step S709 becomes NO, the CPU 901 proceeds to Step S710 in which a key entry through the operation panel unit 201 is checked. Also, upon a completion of outputting the sample set in Step S705, the CPU 901 proceeds to Step S710 to wait for an appropriate key entry.

If a result of the check in Step S710 becomes YES, whether the key entry made in Step S710 is of the start key 202 is checked in next Step S711. If the key entry made in Step S710 is of the start key 202 and a result of Step S711 is YES, the CPU 901 starts outputting further copy sets after the sample set in Step S712. Then, the program is ended.

If the key entry made in Step S710 is not of the start key 202 and the result of Step S711 becomes NO, the program proceeds to next Step S713 in which the CPU 901 checks whether the key entry made in Step S710 is of the clear and stop key 203. When a result of the check in Step S713 is YES, the CPU 901 proceeds to next Step S714 in which a reset operation is executed. Then, the program is ended. When a result of the check in Step S713 is NO, the program is returned to Step S710 and goes into a waiting mode for a key entry.

In the above-mentioned procedure for outputting the sample set executed in Step S705, a number of sheets of the original document and a number of total pages of the transfer paper sheets are normally equal. However, these two numbers become different when the N-into-one function is applied. In this case, the page-number-print function may not correctly be executed because a number of total page of the transfer paper sheets is obtained incorrect.

A procedure of obtaining a correct number of total pages of the transfer paper sheets in the above-mentioned situation is explained with reference to FIG. 20. Specifically, this procedure is implemented in Step S705 of FIG. 19. In this flowchart shown in FIG. 20, variables $X_{11}$ and $X_{12}$ are used in addition to $X_1$. A number of a total page of transfer paper sheets is represented by $X_{11}$, and a number of pages of the original document to be allocated into one page of transfer paper sheet in the N-into-one mode is represented by $X_{12}$.

Figure 20:
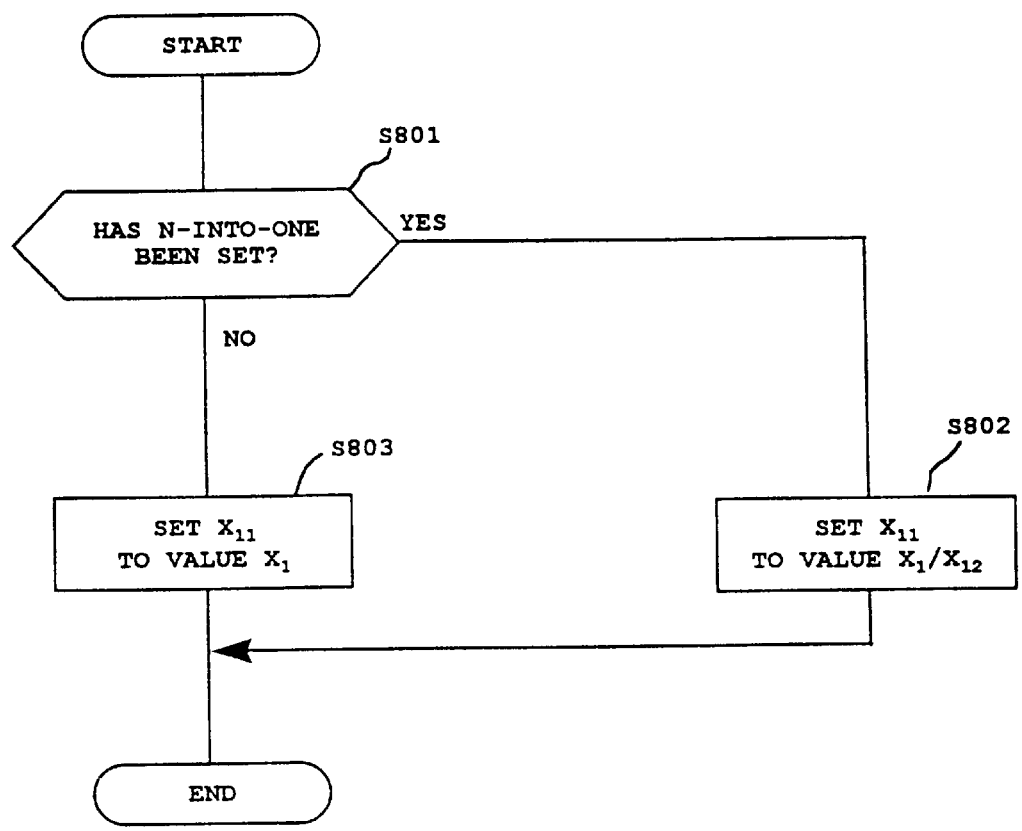

In Step S801 in FIG. 20, the CPU 901 checks whether the N-into-one function is set. If the N-into-one function is set and a result of Step S801 becomes YES, the CPU 901 proceeds to Step S802 in which the CPU 901 substitutes a value obtained by dividing a value of $X_1$ with a value of N into $X_{11}$. Then, the operation flow of this program is ended. If the N-into-one function is not set and the result of Step S801 becomes NO, the CPU 901 proceeds to Step S803 in which the CPU 901 substitutes a value of $X_1$ into $X_{11}$, and then finishes this operation. Thus, a correct number of total pages of the transfer paper sheets can be obtained and is used in an execution of the page-number-print function.

In this way, the novel image forming apparatus 100 can automatically execute outputting a sample set for allowing the operator to confirm the way of copying before outputting multiple copy sets requested, regardless of whether the page-number print function is applied. Also, in this way, the novel image forming apparatus 100 can eliminate a process for requiring the operator to input a total page number during an operation of outputting multiple copy sets in the single sided print format using the ADF and the electric sorting during the sample set command mode.

Figure 21:
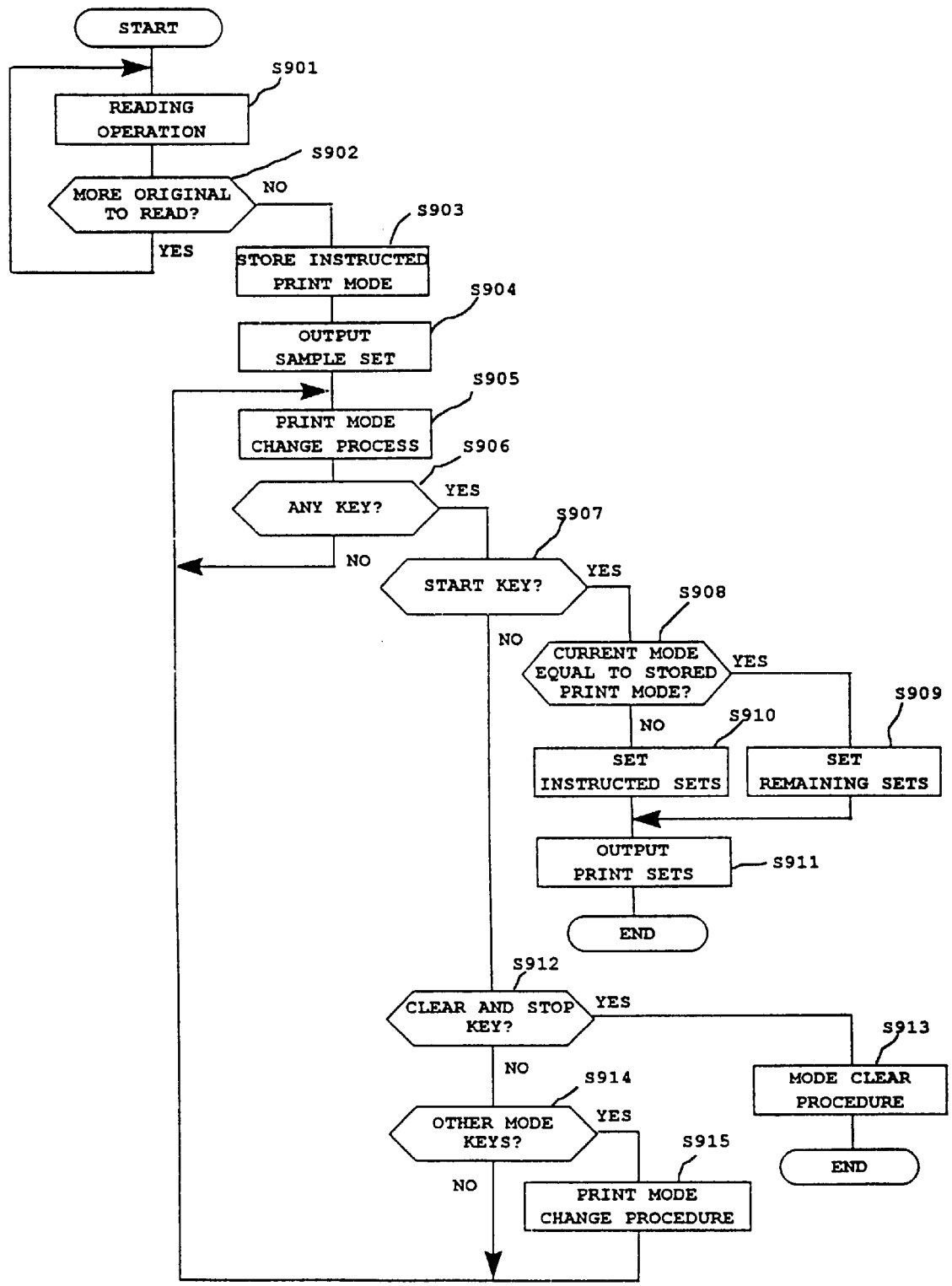
FIG. 21 is a flowchart explaining how an instructed number of output sets can automatically be output when a sample set can not be made in a preferable way.

Next, an extensive feature of the above-mentioned sample set command mode related, in particular, to a number of output sets to be output is explained by referencing to FIG. 21. More specifically, a number of output sets may ideally be changed depending whether a sample set is accepted or not by an operator. When the operator does not accept how the copying is performed on a sample set and changes an image forming mode, such as a page-number print, for example, the operator can repeat the procedure, obtaining another sample set and so forth. When the operator accepts the sample set and instructs to output all the remaining output sets, a number of remaining sets may correctly be a number of the remaining output sets added with a value "1" (one) which is exactly the number previously instructed by the operator. An image forming apparatus 100 is capable of adjusting a number of copy sets to be output, after the sample set is made, on the basis of whether any of image forming conditions requiring the read-again operation is made or not.

In Step S901 shown in FIG. 21, a reading operation inclusive of transferring and reading the original document, and storing read image data into the image memory 501 is performed. Then, in next Step S902, whether the sheets of the original document have been all transferred is checked by the CPU 901 using the original document detector 108. If the original document remains and a result of Step S902 becomes YES, the program is returned to Step S901 so as to executes a reading operation for a next sheet of the original document. If all sheets of the original document have been transferred and the result of Step S902 becomes NO, the CPU 901 proceeds to Step S903 in which the designated image forming conditions are registered. Then, in next Step S904, a sample set is output.

Further, in next Step S905, the CPU 901 executes key entry processing in which a change of image forming conditions by the operator via the operation panel unit 201 is allowed. Then, in Step S906, whether any key entry is made is determined. When a key entry is not made and a result of Step S906 is NO, the program is returned to Step S905 and goes into a waiting state for a key entry. When a key entry is made and the result of Step 906 is YES, the CPU 901 proceeds to next Step S907 in which an entry of the start key 202 is checked. When the start key 202 is pressed and a result of Step S907 is YES, the program proceeds to Step S908 in which the CPU 901 checks whether the present image forming conditions and the registered image forming conditions are equal or not.

When the present image forming conditions and the registered image forming conditions are equal and a result of Step S908 becomes YES, the CPU 901 proceeds to Step S909 in which the CPU 901 substitutes a number obtained by subtracting a number of the instructed output sets by value "1" (one) into a number of expected output sets. When the result of Step S908 is NO, the CPU 901 proceeds to Step S910 in which the CPU 901 substitutes a number of instructed output sets into a number of expected output sets. Then, in next Step S911, the CPU 901 executes outputting the expected output sets in accordance with the present image forming conditions and ends the operation of this program.

When the start key 202 is not pressed and the result of Step S907 is made NO, the program proceeds to Step S912 and a next check is made on whether the clear and stop key 203 is pressed. If the clear and stop key 203 is pressed and a result of Step S912 is YES, the program proceeds to Step S913 and the system is reset. Then, the program is ended.

If the clear and stop key 203 is not pressed and the result of Step S912 is NO, the program proceeds to Step S914 and the CPU 901 checks whether any effective key other than the start key 202 and the clear and stop key 203 is pressed. If no effective key is pressed and a result of Step S914 is NO, the program is returned to Step S905 and goes into a waiting state for a key entry. If an effective key is pressed and the result of Step S914 is YES, the CPU 901 proceeds to Step S915 and executes a process for establishing copy conditions. Then, the program is returned to Step S905 to go into a waiting state for a key entry.

In this way, the image forming apparatus 100 can adjust a number of expected copy sets on the basis of whether any of image forming conditions requiring the read-again operation is made or not, after outputting the sample set. Accordingly, the novel image forming apparatus 100 can output a correct number of output sets in a preferred image forming manner.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese Patent application JPAP08-097211 filed in the Japanese Patent Office on Apr. 18, 1996, and also based on another Japanese Patent Application filed on Mar. 17, 1997 of which official file number is not yet available. Entire contents of these two applications are hereby incorporated by reference.

What we claim is:

1. An image forming apparatus comprising:

reading means provided at a reading position of said apparatus for reading each sheet of an original document and for generating image data corresponding thereto;

storing means for storing image data of each sheet of the original document read by said reading means;

image forming means for forming an image on an output medium in accordance with the image data stored in said storing means;

input means for inputting instructions to the image forming apparatus, the instructions including an instruction specifying a total number of sets of copies to be made, instructions specifying various types of functions to be performed by the apparatus and a sample set instruction setting the image forming apparatus into a sample set command mode in which one copy of the original document is output by said image forming means as a sample copy;

control means for controlling said apparatus depending on the type of functions input by said input means, wherein in the sample set command mode, after a user views the sample copy the user can input via said input means, instructions changing one or more of the various types of functions to be performed, said control means selectively controlling said apparatus based upon the types of functions changed by the user to a) read the image data from the storing means and form an image with the image data by use of said image forming means or b) cause said reading means to reread each sheet of the original document and store new image data of each sheet of the original document reread by said reading means in said storing means and cause said image forming means to form an image on the output medium in accordance with the new image data stored in said storing means.

2. The image forming apparatus according to claim 1, wherein one of said functions is a staple print function, by a change of which in the sample set command mode the image data is read from the memory and used by said image forming means to form an image.

3. The image forming apparatus according to claim 1, wherein one of said functions is an output-page-number print function, by a change of which in the sample set command mode the image data is read from the memory and used by said image forming means to form an image.

4. The image forming apparatus according to claim 1, wherein one of said functions is an output-stamp-print function, by a change of which in the sample set command mode the image data is read from the memory and used by said image forming means to form an image.

5. The image forming apparatus according to claim 1, wherein one of said functions is a sort function, by a change of which in the sample set command mode the image data is read from the memory and used by said image forming means to form an image.

6. The image forming apparatus according to claim 1, wherein one of said functions is a double sided print function, by a change of which in the sample set command mode the image data is read from the memory and used by said image forming means to form an image.

7. An image forming apparatus, which includes an automatic document feeder having an original document detect sensor for detecting an original document consisting of at least one sheet and for successively transferring the original document into said image forming apparatus, said apparatus comprising:

reading means for reading an original document successively transferred by said automatic document feeder;

storing means for storing image data of the original document read by said reading means;

image forming means for forming an image on an output medium in accordance with the image data stored in said storing means;

output medium container for containing a plurality of an output medium;

outputting means for outputting an output medium including an image thereon;

a start key for starting a series of operations including an original document reading operation by said reading means, an image forming operation by said image forming means, and an outputting operation by said outputting means;

a first memory for storing data representing functions of a first group, each function changing conditions of a corresponding image handling mode and activating operations of reading an image of an original document one more time and storing said read image into said storing means under changed conditions;

a second memory for storing data representing functions of a second group, each function changing conditions of at least one of a corresponding image handling mode and a corresponding finishing mode of a set of an output medium using image data already stored in an output image form in said storing means, said functions of said second group being different from said functions of said first group;

instruction receiving means for receiving an instruction specifying a total number of sets of an output medium including an images of an original document, an instruction specifying a function from among said functions stored said first memory and said second memory, and an instruction specifying a change of said conditions of at least one of said image handling and finishing modes;

a sample set command mode key for putting said image forming apparatus into a sample set command mode in which at least one sample set of an output medium including images formed by said image forming means in accordance with images of an original document read by said reading means is output and in which said image forming means automatically stops said image forming operation upon a time of outputting said sample set of said output medium, said sample set command mode key being valid only when a total number of sets of an output medium entered through said instruction receiving means is larger than one;

control means for controlling said reading means, said image forming means, and said outputting means to output at least one sample set of an output medium including images formed by said image forming means in accordance with images of an original document read by said reading means upon a time when said sample set command key is pressed, and then to stop, for controlling said instruction receiving means to receive said instructions of said functions and said conditions upon a completion of outputting said sample set of said output medium, for controlling said reading means, said image forming means, and said outputting means to output remaining numbers of sets of said output medium under conditions instructed by said received instructions of said functions and said conditions upon a time that said start key is pressed when said received instructions of said functions are verified by said functions stored in said first memory during a time of said sample set command mode, and for controlling said image forming means and said outputting means to output said remaining numbers of said sets of said output medium using said image data already stored in said storing means under conditions instructed by said received instructions of said functions and said conditions upon a time that said sample set command key is pressed when said received instructions of said functions are verified by said functions stored in said second memory during a time of said sample set command mode, said remaining numbers of said sets of said output medium being calculated by subtracting said total number of sets of said output medium previously entered by one.

8. An image forming apparatus, which includes an automatic document feeder having an original document detect sensor for detecting an original document consisting of at least one sheet and successively transferring said original document into said image forming apparatus, comprising:

reading means for reading said original document successively transferred by said automatic document feeder;

storing means for storing image data of said original document read by said reading means;

image forming means for forming an image on an output medium in accordance with said image data stored in said storing means;

a plurality of output medium containers each for containing a plurality of an output medium, each of said output medium containers containing an output medium differing from an output medium contained by other containers, a first output medium container of a plurality of an output medium containers having a first shortest transferring path to said image forming means is numbered with one, a second output medium container of a plurality of an output medium containers having a second shortest transferring path to said image forming means is numbered with two, and an n-th output medium container of a plurality of an output medium containers having a n-th shortest transferring path to said image forming means is numbered with number n;

outputting means for outputting an output medium including an image thereon;

a start key for starting a series of operations including an original document reading operation by said reading means, an image forming operation by said image forming means, and an outputting operation by said outputting means;

a first memory for storing data representing functions of a first group, each function changing conditions of a corresponding image handling mode and activating operations of reading an image of an original document one more time and storing a read image into said storing means under changed conditions;

a second memory for storing data representing functions of a second group, each function changing conditions of at least one of a corresponding image handling mode and a corresponding finishing mode of a set of an output medium using image data already stored in an output image form in said storing means;

a third memory for storing data representing status of a size and a format of an output medium contained by each output medium container among a plurality of said output medium containers and by a currently selected output medium container, and an output medium transferring path length between each output medium container among a plurality of said output medium containers and said image forming means;

instruction receiving means for receiving an instruction specifying a total number of sets of an output medium including images of an original document, an instruction specifying a function from among said functions stored in said first memory and said second memory, an instruction specifying a change of said conditions of at least one of said image handling and finishing modes, and an instruction specifying an output medium container from among said output medium containers;

a sample set command mode key for putting said image forming apparatus into a sample set command mode in which at least one sample set of an output medium including images formed by said image forming means in accordance with images of an original document read by said reading means is output and in which said image forming means automatically stops said image forming operation upon a time of outputting said sample set of said output medium, said sample set command mode key being valid only when a total number of sets of said output medium entered through said instruction receiving means is larger than one;

control means for selecting an output medium container, as a temporary use only for said sample set of said output medium, having an output medium transferring path length shorter than said output medium container previously selected by said instruction and containing an output medium of which size is equal to said output medium contained by said output medium container previously selected by said instruction, for controlling said reading means, said image forming means, and said outputting means to output at least one sample set of said output medium including said images formed by said image forming means in accordance with said images of said original document read by said reading means, using said temporary selected output medium container, upon a time when said sample set command key is pressed, and then to stop, for controlling said instruction receiving means to receive said instructions of said functions and said conditions upon a completion of outputting said sample set of said output medium, for controlling said reading means, said image forming means, and said outputting means to output remaining numbers of sets of said output medium using said previously selected output medium container under conditions instructed by said received instructions of said functions and said conditions upon a time that said start key is pressed when said received instructions of said functions are verified by said functions stored in said first memory during a time of said sample set command mode, and for controlling said image forming means and said outputting means to output said remaining numbers of said sets of said output medium using said image data already stored in said storing means using said previously selected output medium container under conditions instructed by said received instructions of said functions and said conditions upon a time that said sample set command key is pressed when said received instructions of said functions are verified by said functions stored in said second memory during a time of said sample set command mode, said remaining numbers of said sets of said output medium being calculated by subtracting said total number of sets of said output medium previously entered by one.

9. An image forming apparatus comprising:

a scanner provided at a reading position of said apparatus for reading each sheet of an original document and for generating image data corresponding thereto;

a memory for storing image data of each sheet of the original document read by said scanner;

a printer for forming an image on an output medium in accordance with the image data stored in said scanner;

a ten-key pad for inputting instructions to the image forming apparatus, the instructions including an instruction specifying a total number of sets of copies to be made, instructions specifying various types of functions to be performed by the apparatus and a sample set instruction setting the image forming apparatus into a sample set command mode in which one copy of the original documents is output by said printer as a sample copy;

a controller for controlling said apparatus depending on the type of functions input by said ten-key pad, wherein in the sample set command mode, after a user views the sample copy the user can input via said ten-key pad, instructions changing one or more of the various types of functions to be performed, said controller selectively controlling said apparatus based upon the types of functions changed by the user to a) read the image data from the memory and form an image with the image data by use of said printer or b) cause said scanner to reread each sheet of the original document and store new image data of each sheet of the original document reread by said scanner in said memory and cause said printer to form an image on the output medium in accordance with the new image data stored in said memory.

10. The image forming apparatus according to claim 9, wherein one of said functions is a staple function, by a change of which in the sample set command mode the image data is read from the memory and used by said printer to form an image.

11. The image forming apparatus according to claim 9, wherein one of said functions is an output-page-number print function, by a change of which in the sample set command mode the image data is read from the memory and used by said printer to form an image.

12. The image forming apparatus according to claim 9, wherein one of said functions is an output-stamp-print function, by a change of which in the sample set command mode the image data is read from the memory and used by said printer to form an image.

13. The image forming apparatus according to claim 9, wherein one of said functions is a sort function, by a change of which in the sample set command mode the image data is read from the memory and used by said printer to form an image.

14. The image forming apparatus according to claim 9, wherein one of said functions is a double sided print function, by a change of which in the sample set command mode the image data is read from the memory and used by said printer to form an image.

15. An image forming apparatus, which includes an automatic document feeder having an original document detect sensor for detecting an original document consisting of at least one sheet and successively transferring said original document into said image forming apparatus, comprising:

a scanner for reading an original document successively transferred by said automatic document feeder;

an image memory for storing image data of an original document read by said scanner;

a printer for forming an image on a recording sheet in accordance with image data stored in said image memory;

a recording sheet tray for containing a plurality of a recording sheet;

a finishing unit for outputting a recording sheet including said image thereon;

a start key for starting a series of operations including an original document reading operation by said scanner, an image forming operation by said printer, and an outputting operation by said finishing unit;

a first memory for storing data representing functions of a first group, each function changing conditions of a corresponding image handling mode and activating operations of reading an image of an original document one more time and storing said read image into said image memory under changed conditions;

a second memory for storing data representing functions of a second group, each function changing conditions of at least one of a corresponding image handling mode and a corresponding finishing mode of a set of a recording sheet using image data already stored in an output image form in said image memory;

a ten-key pad for receiving an instruction specifying a total number of sets of a recording sheet including images of an original document, an instruction specifying a function from among said functions stored in said first memory and said second memory, and an instruction specifying a change of said conditions of at least one of said image handling and finishing modes;

a sample set command mode key for putting said image forming apparatus into a sample set command mode in which at least one sample set of a recording sheet including images formed by said printer in accordance with images of an original document read by said scanner is output and in which said printer automatically stops said image forming operation upon a time of outputting said sample set of said recording sheet, said sample set command mode key being valid only when a total number of sets of a recording sheet entered through said ten-key pad is larger than one;

a controller for controlling said scanner, said printer, and said finishing unit to output at least one sample set of a recording sheet including images formed by said printer in accordance with images of an original document read by said scanner upon a time when said sample set command key is pressed, and then to stop, for controlling said ten-key pad to receive said instructions of said functions and said conditions upon a completion of outputting said sample set of said recording sheet, for controlling said scanner, said printer, and said finishing unit to output remaining numbers of sets of said recording sheet under conditions instructed by said received instructions of said functions and said conditions upon a time that said start key is pressed when said received instructions of said functions are verified by said functions stored in said first memory during a time of said sample set command mode, and for controlling said printer and said finishing unit to output said remaining numbers of said sets of said recording sheet using image data already stored in said image memory under conditions instructed by said received instructions of said functions and said conditions upon a time that said sample set command key is pressed when said received instructions of said functions are verified by said functions stored in said second memory during a time of said sample set command mode, said remaining numbers of said sets of said recording sheet being calculated by subtracting said total number of sets of said recording sheet previously entered by one.

16. An image forming apparatus, which includes an automatic document feeder having an original document detect sensor for detecting an original document consisting of at least one sheet and successively transferring said original document into said image forming apparatus, comprising:

a scanner for reading an original document successively transferred by said automatic document feeder;

an image memory for storing image data of an original document read by said scanner;

a printer for forming an image on a recording sheet in accordance with image data stored in said image memory;

a plurality of recording sheet trays each for containing a plurality of s recording sheet, each of said recording sheet trays containing s recording sheet differing from s recording sheet contained by other recording sheet trays, a first recording sheet tray of said recording sheet trays having a first shortest transferring path to said printer is numbered with one, a second recording sheet tray of said recording sheet trays having a second shortest transferring path to said printer is numbered with two, and an n-th recording sheet tray of said recording sheet trays having a n-th shortest transferring path to said printer is numbered with number n;

a finishing unit for outputting a recording sheet including an image thereon;

a start key for starting a series of operations including an original document reading operation by said scanner, an image forming operation by said printer, and an outputting operation by said finishing unit;

a first memory for storing data representing functions of a first group, each function changing conditions of a corresponding image handling mode and activating operations of reading an image of an original document one more time and storing said read image into said image memory under changed conditions;

a second memory for storing data representing functions of a second group, each function changing conditions of at least one of a corresponding image handling mode and a corresponding finishing mode of a set of a recording sheet using image data already stored in an output image form in said scanner;

a third memory for storing data representing status of a size and a format of a recording sheet contained by each recording sheet tray among a plurality of said recording sheet trays and by a currently selected recording sheet tray, and an recording sheet transferring path length between each recording sheet tray among said recording sheet trays and said printer;

a ten-key pad for receiving an instruction specifying a total number of sets of a recording sheet including images of an original document, an instruction specifying a function from among said functions stored in said first memory and said second memory, an instruction specifying a change of said conditions of at least one of said image handling and finishing modes, and an instruction specifying a recording sheet tray from among said recording sheet trays;

a sample set command mode key for putting said image forming apparatus into a sample set command mode in which at least one sample set of a recording sheet including images formed by said printer in accordance with images of an original document read by said scanner is output and in which said printer automatically stops said image forming operation upon a time of outputting said sample set of said recording sheet, said sample set command mode key being valid only when a total number of sets of a recording sheet entered through said instruction receiving means is larger than one;

a controller for selecting a recording sheet tray, as a temporary use only for a sample set of a recording sheet, having an recording sheet transferring path length shorter than a recording sheet tray previously selected by said instruction and containing a recording sheet of which size is equal to a recording sheet contained by said recording sheet tray previously selected by said instruction, for controlling said scanner, said printer, and said finishing unit to output at least one sample set of a recording sheet including images formed by said printer in accordance with images of an original document read by said scanner, using said temporary selected recording sheet tray, upon a time when said sample set command key is pressed, and then to stop, for controlling said ten-key pad to receive said instructions of said functions and said conditions upon a completion of outputting said sample set of said recording sheet, for controlling said scanner, said printer, and said finishing unit to output remaining numbers of sets of said recording sheet using said previously selected recording sheet tray under conditions instructed by said received instructions of said functions and said conditions upon a time that said start key is pressed when said received instructions of said functions are verified by said functions stored in said first memory during a time of said sample set command mode, and for controlling said printer and said finishing unit to output said remaining numbers of said sets of said recording sheet using image data already stored in said image memory using said previously selected recording sheet tray under conditions instructed by said received instructions of said functions and said conditions upon a time that said sample set command key is pressed when said received instructions of said functions are verified by said functions stored in said second memory during a time of said sample set command mode, said remaining numbers of said sets of said recording sheet being calculated by subtracting a total number of sets of a recording sheet previously entered by one.

17. An image forming method comprising steps of:

reading each sheet of an original document and for generating image data corresponding thereto by a scanner provided at the reading position of said apparatus;

storing image data of each sheet of the original document, read by said scanner, into a memory;

forming an image on an output medium in accordance with the image data, stored in said scanner, by a printer;

inputting instructions to the image forming apparatus via a ten-key pad, the instructions including an instruction specifying a total number of sets of copies to be made, instructions specifying various types of functions to be performed by the apparatus and a sample set instruction setting the image forming apparatus into a sample set command mode in which one copy of the original document is output by said printer as a sample copy;

controlling said apparatus, by a controller, depending on the type of functions input by said ten-key pad, wherein in the sample set command mode, after a user views the sample copy the user can input via said ten-key pad, instructions changing one or more of the various types of functions to be performed, said controller selectively controlling said apparatus based upon the types of functions changed by the user to a) read the image data from the memory and form an image with the image data by use of said printer or b) cause said scanner to reread each sheet of the original document and store new image data of each sheet of the original document reread by said scanner in said storing means and cause said printer to form an image on the output medium in accordance with the new image data stored in said memory.

18. The image forming method according to claim 17, wherein one of said functions is a staple function, by a change of which in the sample set command mode the image data is read from the memory and used by said printer to form an image.

19. The image forming method according to claim 17, wherein one of said functions is an output-page-number print function, by a change of which in the sample set command mode the image data is read from the memory and used by said printer to form an image.

20. The image forming method according to claim 17, wherein one of said functions is an output-stamp-print function, by a change of which in the sample set command mode the image data is read from the memory and used by said printer to form an image.

21. The image forming method according to claim 17, wherein one of said functions is a sort function, by a change of which in the sample set command mode the image data is read from the memory and used by said printer to form an image.

22. The image forming method according to claim 17, wherein one of said functions is a double sided print function, by a change of which in the sample set command mode the image data is read from the memory and used by said printer to form an image.

23. A method of forming an image on an image forming apparatus, which includes an automatic document feeder having an original document detect sensor for detecting an original document consisting of at least one sheet and successively transferring said original document into said image forming apparatus, comprising steps of:

reading an original document successively transferred by said automatic document feeder;

storing image data of an original document read during said reading step, into an image storing means;

forming an image on an output medium in accordance with image data stored said image storing means during said storing step;

outputting an output medium including an image thereon, said output medium being contained in an output medium container;

starting a series of operations including an original document reading operation by said reading step, an image forming operation by said forming step, and an outputting operation by said outputting step;

storing first functional data representing functions of a first group, each function changing conditions of a corresponding image handling mode and initiating said steps of reading and storing one more time under changed conditions;

storing second functional data representing functions of a second group, each function changing conditions of at least one of a corresponding image handling mode and a corresponding finishing mode of a set of an output medium using image data already stored in an output image form during a previous image data storing step, said functions of said second group being different from said functions of said first group;

receiving an instruction specifying a total number of sets of an output medium including an images of an original document, an instruction specifying a function from among said functions of said first and second groups, and an instruction specifying a change of said conditions of at least one of said image handling and finishing modes;

initiating a sample set command mode in which at least one sample set of an output medium including images formed during said image forming step in accordance with images of an original document read during said reading step is output and in which said image forming operation is automatically stopped during said image forming step upon a time of outputting said sample set of said output medium, said sample set command mode key being valid only when a total number of sets of an output medium entered during said instruction receiving step is larger than one;

controlling said series of said operations by starting said reading step, said image forming step, and said outputting step to output at least one sample set of an output medium including images formed during said image forming step in accordance with images of an original document read during said reading step upon a time when said sample set command key is pressed, and then to stop, for starting said instruction receiving step to receive said instructions of said functions and said conditions upon a completion of outputting said sample set of said output medium, for starting said reading step, said image forming step, and said outputting step to output remaining numbers of sets of said output medium under conditions instructed by said received instructions of said functions and said conditions upon a time that said start key is pressed when said received instructions of said functions are verified by said functions stored during said first functional data storing step during a time of said sample set command mode, and for starting said image forming step and said outputting step to output said remaining numbers of said sets of said output medium using said image data already stored during said storing step under conditions instructed by said received instructions of said functions and said conditions upon a time that said sample set command key is pressed when said received instructions of said functions are verified by said functions stored during said second functional dada storing step during a time of said sample set command mode, said remaining numbers of said sets of said output medium being calculated by subtracting said total number of said sets of said output medium previously entered by one.

24. A method of forming an image on an image forming apparatus, which includes an automatic document feeder having an original document detect sensor for detecting an original document consisting of at least one sheet and successively transferring said original document into said image forming apparatus, comprising steps of:

reading an original document successively transferred by said automatic document feeder;

storing image data of an original document read during said reading step;

forming an image on an output medium in accordance with image data stored during said image storing step;

outputting an output medium including an image thereon, said output medium being contained in an output medium containers, a plurality of output medium containers being including in said image forming apparatus each for containing a plurality of an output medium, each of said output medium containers containing an output medium differing from an output medium contained by other containers, a first output medium container of a plurality of an output medium containers having a first shortest transferring path to a region in which an image is formed is numbered with one, a second output medium container of a plurality of an output medium containers having a second shortest transferring path to said region in which an image is formed is numbered with two, and an n-th output medium container of a plurality of an output medium containers having a n-th shortest transferring path to said region in which an image is formed is numbered with number n;

starting a series of operations including an original document reading operation by said reading step, an image forming operation by said image forming step, and an outputting operation by said outputting step;

storing first functional data representing functions of a first group, each function changing conditions of a corresponding image handling mode and activating said steps of reading and storing one more time under changed conditions;

for storing second functional data representing functions of a second group, each function changing conditions of at least one of a corresponding image handling mode and a corresponding finishing mode of a set of an output medium using image data already stored in an output image form during said storing step;

storing data representing status of a size and a format of an output medium contained by each output medium container among a plurality of said output medium containers and by a currently selected output medium container, and an output medium transferring path length between each output medium container among a plurality of said output medium containers and said region in which an image is formed;

receiving an instruction specifying a total number of sets of an output medium including images of an original document, an instruction specifying a function from among said functions stored during said first and second functional steps, an instruction specifying a change of said conditions of at least one of said image handling and finishing modes, and an instruction specifying an output medium container from among said output medium containers;

initiating a sample set command mode in which at least one sample set of an output medium including images formed during said image forming step in accordance with images of an original document read during said reading step is output and in which said image forming operation is automatically stopped during said image forming step upon a time of outputting said sample set of said output medium, said sample set command mode key being valid only when a total number of sets of said output medium entered during said instruction receiving step is larger than one;

selecting an output medium container, as a temporary use only for said sample set of said output medium, having an output medium transferring path length shorter than said output medium container previously selected by said instruction and containing an output medium of which size is equal to said output medium contained by said output medium container previously selected by said instruction, for starting said reading step, said image forming step, and said outputting step to output at least one sample set of said output medium including said images formed during said image forming step in accordance with said images of said original document read during said reading step, using said temporary selected output medium container, upon a time when said sample set command key is pressed, and then to stop, for initiating said instruction receiving step to receive said instructions of said functions and said conditions upon a completion of outputting said sample set of said output medium, for starting said reading step, said image forming step, and said outputting step to output remaining numbers of sets of said output medium using said previously selected output medium container under conditions instructed by said received instructions of said functions and said conditions upon a time that said start key is pressed when said received instructions of said functions are verified by said functions stored during said first functional data storing step during a time of said sample set command mode, and for starting said image forming step and said outputting step to output said remaining numbers of said sets of said output medium using said image data already stored during said storing step using said previously selected output medium container under conditions instructed by said received instructions of said functions and said conditions upon a time that said sample set command key is pressed when said received instructions of said functions are verified by said functions stored during said second functional data storing step during a time of said sample set command mode, said remaining numbers of said sets of said output medium being calculated by subtracting said total number of sets of said output medium previously entered by one.

* * * * *